US012802421B2

(12) United States Patent
Hongo

(10) Patent No.: US 12,802,421 B2
(45) Date of Patent: Nov. 17, 2026

(54) OBJECT PROCESSING APPARATUS, OBJECT DETERMINATION METHOD, AND NON-TRANSITORY COMPUTER-EXECUTABLE MEDIUM

(71) Applicant: PFU LIMITED, Ishikawa (JP)

(72) Inventor: Masanobu Hongo, Ishikawa (JP)

(73) Assignee: PFU Limited, Ishikawa (JP)

( * ) Notice: Subject to any disclaimer, the term of this patent is extended or adjusted under 35 U.S.C. 154(b) by 223 days.

(21) Appl. No.: 18/423,191

(22) Filed: Jan. 25, 2024

(65) Prior Publication Data

US 2024/0257507 A1 Aug. 1, 2024

(30) Foreign Application Priority Data

Jan. 30, 2023 (JP) ................................ 2023-012012

(51) Int. Cl.
*G06V 10/80* (2022.01)
*B07C 5/34* (2006.01)
(Continued)

(52) U.S. Cl.
CPC .......... *G06V 10/806* (2022.01); *B07C 5/3416* (2013.01); *B07C 5/342* (2013.01); *G05B 19/4155* (2013.01); *G06V 20/50* (2022.01); *G06V 20/60* (2022.01); *H04N 9/3179* (2013.01); *H04N 23/90* (2023.01);
(Continued)

(58) Field of Classification Search
CPC ... B07C 5/3416; B07C 5/342; G05B 14/4155; G05B 2219/50391; G06T 7/0004; G06T 7/001; G06T 2207/10116; G06T 2207/30108; G06V 10/806; G06V 20/50; G06V 20/60; H04N 9/3179; H04N 23/90
See application file for complete search history.

(56) References Cited

U.S. PATENT DOCUMENTS

| | | | | |
|---|---|---|---|---|
| 7,449,695 | B2 | 11/2008 | Zimdars et al. | |
| 10,710,119 | B2 * | 7/2020 | Kumar | B07C 5/3416 |

(Continued)

FOREIGN PATENT DOCUMENTS

| | | | |
|---|---|---|---|
| EP | 3767284 | A1 | 1/2021 |
| JP | 2008-500541 | A | 1/2008 |

(Continued)

OTHER PUBLICATIONS

Abhimanyu et al. "RGB-X classification for electronics sorting." 2022 IEEE/RSJ International Conference on Intelligent Robots and Systems (IROS). IEEE, 2022. (Year: 2022).*

(Continued)

*Primary Examiner* — Katrina R Fujita
(74) *Attorney, Agent, or Firm* — RIMON P.C.

(57) ABSTRACT

An object processing apparatus includes a first imaging device to capture a surface of a subject to obtain a surface image. The object processing apparatus includes a second imaging device to capture an internal object in the subject to obtain an internal image. The object processing apparatus includes circuitry configured to determine whether the subject is a battery-containing product that has a built-in battery based on the surface image and the internal image to generate a determination result. The object processing apparatus includes a processing device to operate based on the determination result.

13 Claims, 15 Drawing Sheets

(51) Int. Cl.

| | |
|---|---|
| ***B07C 5/342*** | (2006.01) |
| ***G05B 19/4155*** | (2006.01) |
| ***G06T 7/00*** | (2017.01) |
| ***G06V 20/50*** | (2022.01) |
| ***G06V 20/60*** | (2022.01) |
| ***H04N 9/31*** | (2006.01) |
| ***H04N 23/90*** | (2023.01) |

(52) U.S. Cl.

CPC .. *G05B 2219/50391* (2013.01); *G06T 7/0004* (2013.01); *G06T 7/001* (2013.01); *G06T 2207/10116* (2013.01); *G06T 2207/30108* (2013.01)

(56) References Cited

U.S. PATENT DOCUMENTS

| | | | | |
|---|---|---|---|---|
| 11,756,201 | B2 | 9/2023 | Geurts et al. | |
| 12,522,442 | B2 * | 1/2026 | Chellappan | B07C 5/342 |
| 2012/0105812 | A1 * | 5/2012 | Dekker | H04N 9/3129<br>353/121 |
| 2013/0141115 | A1 * | 6/2013 | Bourely | G01N 22/00<br>378/53 |
| 2014/0367316 | A1 * | 12/2014 | Saeedkia | B07C 5/3416<br>250/341.1 |
| 2015/0108989 | A1 * | 4/2015 | Sloop | B07C 5/342<br>324/426 |
| 2016/0078678 | A1 * | 3/2016 | Hotte | B07C 7/005<br>705/7.13 |
| 2016/0228920 | A1 * | 8/2016 | Doublet | B07C 5/34 |
| 2018/0128936 | A1 * | 5/2018 | Franco | G01V 5/224 |
| 2021/0149073 | A1 * | 5/2021 | Burger | G01V 5/22 |
| 2021/0346916 | A1 * | 11/2021 | Kumar | B07C 5/34 |
| 2022/0016675 | A1 * | 1/2022 | Kumar | B07C 5/34 |
| 2023/0023641 | A1 * | 1/2023 | Rosenfeld | G06V 10/60 |
| 2023/0062938 | A1 * | 3/2023 | Murphy | G06V 10/774 |
| 2023/0169751 | A1 * | 6/2023 | Geurts | G06V 10/774<br>382/159 |

FOREIGN PATENT DOCUMENTS

| | | | | |
|---|---|---|---|---|
| JP | 2022-21894 | A | 2/2022 | |
| WO | 2019/176903 | A | 9/2019 | |
| WO | 2020/175623 | A1 | 9/2020 | |
| WO | 2021/123197 | A1 | 6/2021 | |
| WO | WO-2021209614 | A1 * | 10/2021 | B07C 5/342 |
| WO | 2022/254858 | A1 | 12/2022 | |

OTHER PUBLICATIONS

Abou Baker et al. "An approach for smart and cost-efficient automated E-Waste recycling for small to medium-sized devices using multi-sensors." 2022 IEEE Sensors. IEEE, 2022. (Year: 2022).*

Sterkens et al. "Detection and recognition of batteries on X-Ray images of waste electrical and electronic equipment using deep learning." Resources, Conservation and Recycling 168 (2021): 105246. (Year: 2021).*

Notcie of Reasons for Refusal issued on Sep. 15, 2026, in the corresponding Japanese Patent Application No. 2023-012012.

* cited by examiner

OBJECT PROCESSING APPARATUS, OBJECT DETERMINATION METHOD, AND NON-TRANSITORY COMPUTER-EXECUTABLE MEDIUM

CROSS-REFERENCE TO RELATED APPLICATION

This patent application is based on and claims priority pursuant to 35 U.S.C. § 119(a) to Japanese Patent Application No. 2023-012012, filed on Jan. 30, 2023, in the Japan Patent Office, the entire disclosure of which is hereby incorporated by reference herein.

BACKGROUND

Technical Field

Embodiments of the present disclosure relate to an object processing apparatus, an object determination method, and a non-transitory computer-executable medium.

Related Art

Waste sorting apparatuses that sort one or more particular pieces of waste from multiple pieces of waste are known. Such waste sorting apparatuses generate three-dimensional data of waste that is piled up and conveyed on the basis of image data obtained by imaging the waste with X-rays, and sort an object to be removed from the waste.

SUMMARY

According to an embodiment of the present disclosure, an object processing apparatus includes a first imaging device to capture a surface of a subject to obtain a surface image. The object processing apparatus includes a second imaging device to capture an internal object in the subject to obtain an internal image. The object processing apparatus includes circuitry configured to determine whether the subject is a battery-containing product that has a built-in battery based on the surface image and the internal image to generate a determination result. The object processing apparatus includes a processing device to operate based on the determination result.

According to an embodiment of the present disclosure, an object determination method includes acquiring a surface image in which a surface of a subject appears. The object determination method includes acquiring an internal image in which an internal object in the subject appears. The object determination method includes determining whether the subject is a battery-containing product that has a built-in battery based on the surface image and the internal image.

According to an embodiment of the present disclosure, a non-transitory computer-executable medium storing a plurality of instructions which, when executed by a processor, causes the processor to perform a method. The method includes acquiring a surface image in which a surface of a subject appears. The method includes acquiring an internal image in which an internal object in the subject appears. The method includes determining whether the subject is a battery-containing product that has a built-in battery based on the surface image and the internal image.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
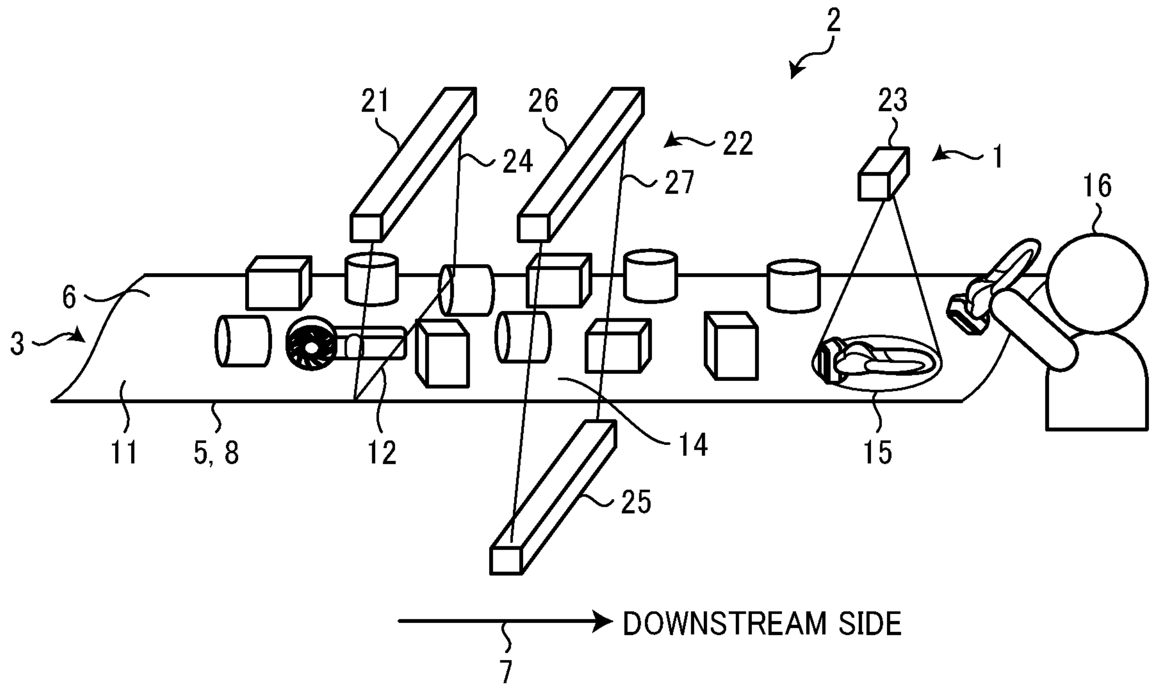
FIG. 1 is a perspective view of a waste sorting apparatus provided with an object processing apparatus, according to Embodiment 1.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of an object processing apparatus, an object determination method, and an object determination program are described with reference to the drawings. The technologies of the present disclosure are not limited to those in the following description. In the following description, like reference signs denote like elements, and redundant descriptions thereof are simplified or omitted.

Embodiment 1

As illustrated in FIG. 1, an object processing apparatus 1 according to Embodiment 1 is provided for a waste sorting apparatus 2. FIG. 1 is a perspective view of the waste sorting apparatus 2 provided with the object processing apparatus 1 according to Embodiment 1. The waste sorting apparatus 2 includes a belt conveyor 3 and the object processing apparatus 1. The belt conveyor 3 includes a belt 5 and a belt driver. The belt 5 is a looped belt and has flexibility. Further, the belt 5 is transparent to X-rays.

A conveyance path 6 is formed in the belt conveyor 3. The conveyance path 6 extends along a plane substantially parallel to a horizontal plane. A straight line along which the conveyance path 6 extends is parallel to a conveyance direction 7 that is parallel to the horizontal plane. The belt 5 includes a conveyance path facing portion 8. The conveyance path facing portion 8 is disposed under the conveyance path 6 and is disposed along the conveyance path 6. The belt 5 is supported by the belt driver so that the conveyance path facing portion 8 translates in the conveyance direction 7. The belt driver moves the belt 5 such that the conveyance path facing portion 8 moves toward the downstream end in the conveyance direction 7.

The conveyance path 6 includes an object supply area 11, a surface image capturing area 12, an internal image capturing area 14, and a work area 15. The surface image capturing area 12 is disposed downstream from the object supply area 11 in the conveyance direction 7. The internal image capturing area 14 is disposed downstream from the surface image capturing area 12 in the conveyance direction 7. The work area 15 is disposed downstream from the internal image capturing area 14 in the conveyance direction 7. In other words, the surface image capturing area 12 and the internal image capturing area 14 are disposed between the object supply area 11 and the work area 15. In the work area 15, a worker 16 finds out a battery-containing product from multiple pieces of waste conveyed along the conveyance path 6, and the worker 16 removes the found battery-containing product from the conveyance path 6. The battery-containing product is a product that includes a built-in battery such as a lithium ion secondary battery. The battery is in a container formed from a material that does not transmit x-rays.

The object processing apparatus 1 includes a visible line image sensor 21, an X-ray sensor 22, and a projector 23. The visible line image sensor 21 is disposed above the surface image capturing area 12 such that the surface image capturing area 12 of the conveyance path 6 is disposed between the conveyance path facing portion 8 of the belt 5 and the visible line image sensor 21. The visible line image sensor 21 receives visible light reflected from an area intersecting a surface image reading plane 24 of the surface of a subject that is present in the conveyance path facing portion 8 and disposed in the surface image capturing area 12. The surface image reading plane 24 is substantially perpendicular to the conveyance direction 7 and intersects the surface image capturing area 12. The visible line image sensor 21 further generates multiple surface line images corresponding to multiple times on the basis of the received visible light. In a particular surface line image corresponding to a certain time among the surface line images, a portion of the surface of a subject that intersects the surface image reading plane 24 at the certain time appears.

The X-ray sensor 22 includes a light emitter 25 and a light receiver 26. The light emitter 25 is disposed below the internal image capturing area 14 of the conveyance path 6. The light emitter 25 emits X-rays along an internal image reading plane 27 toward the internal image capturing area 14. The internal image reading plane 27 is substantially perpendicular to the conveyance direction 7 and intersects the internal image capturing area 14. The light receiver 26 is disposed above the internal image capturing area 14 such that the internal image capturing area 14 is disposed between the light emitter 25 and the light receiver 26. The light receiver 26 receives transmitted X-rays transmitted through the internal image capturing area 14 among X-rays emitted from the light emitter 25. The X-ray sensor 22 generates multiple internal line images corresponding to multiple times on the basis of the transmitted X-rays received by the light receiver 26. In a particular internal line image corresponding to a certain time among the surface line images, a portion of a subject that intersects the internal image reading plane 27 at the certain time appears.

The projector 23 is disposed above the work area 15 of the conveyance path 6 such that the work area 15 is disposed between the projector 23 and the conveyance path facing portion 8 of the belt 5. The projector 23 performs projection mapping to project video onto an object that is present in the work area 15.

Figure 2:
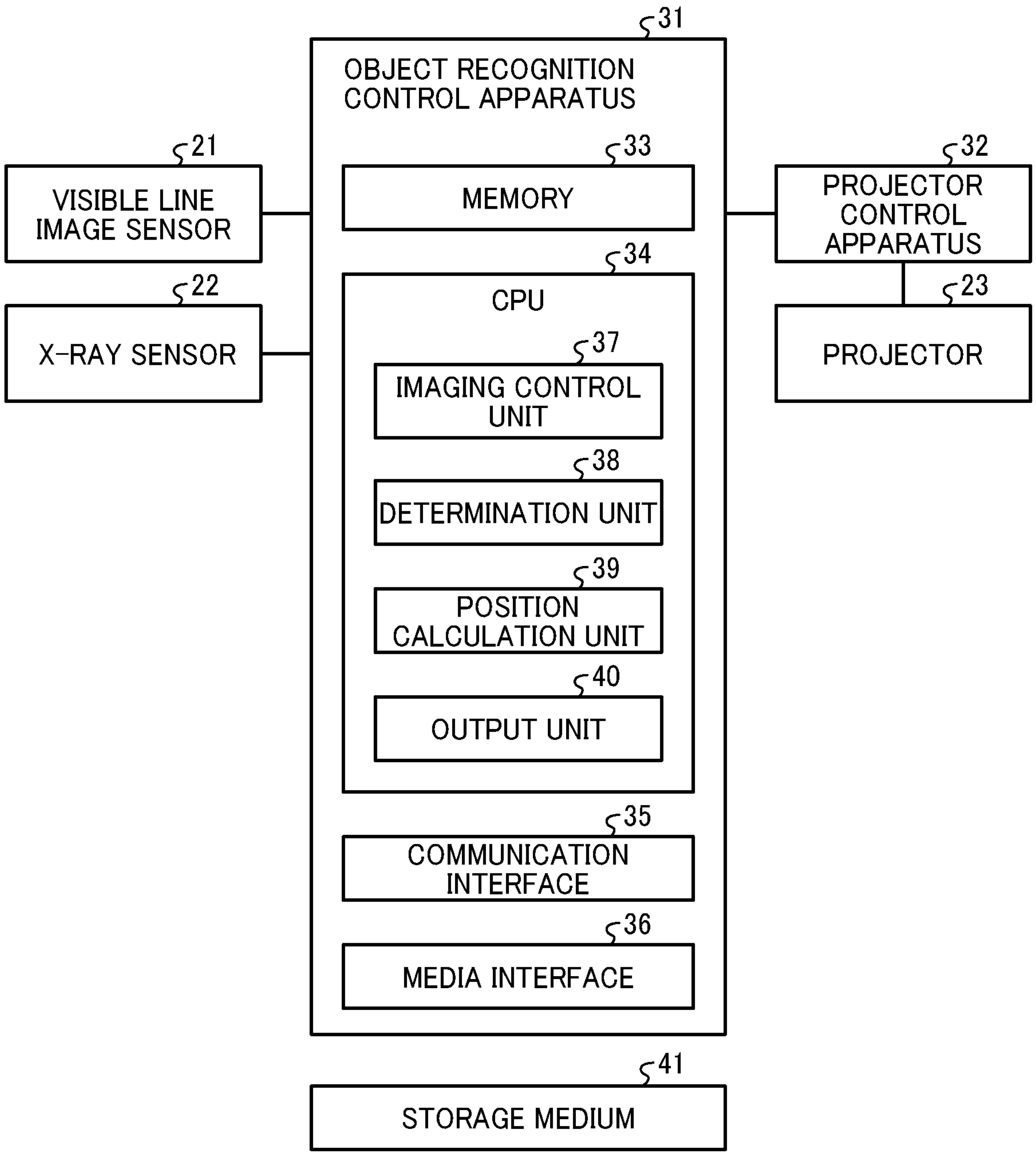
FIG. 2 is a block diagram illustrating an object recognition control apparatus and a projector control apparatus, according to an embodiment of the present disclosure.

As illustrated in FIG. 2, the object processing apparatus 1 further includes an object recognition control apparatus 31 and a projector control apparatus 32. FIG. 2 is a block diagram illustrating the object recognition control apparatus 31 and the projector control apparatus 32. The object recognition control apparatus 31 is connected to the visible line image sensor 21, the X-ray sensor 22, and the projector control apparatus 32 so as to communicate information with each other. The object recognition control apparatus 31 is a computer, and includes a memory 33, a central processing unit (CPU) 34, a communication interface 35, and a media interface 36. In the memory 33, a computer program to be installed in the object recognition control apparatus 31 is recorded, and information used by the CPU 34 is recorded.

The CPU 34 executes the computer program installed in the object recognition control apparatus 31 to perform information processing, controls the memory 33, and control the visible line image sensor 21 and the X-ray sensor 22.

The communication interface 35 downloads information to the object recognition control apparatus 31 from another computer connected through a communication line and transmits information from the object recognition control apparatus 31 to another computer under control of the CPU 34. In the media interface 36, a storage medium 41 that is non-transitory and tangible can be loaded. Examples of the storage medium 41 include a semiconductor memory, a magnetic disk, a magneto-optical disk, and an optical disc. The media interface 36, when the storage medium 41 is loaded therein, reads information from the storage medium 41 and records information in the storage medium 41 under control of the CPU 34. Alternatively, the computer program to be installed in the object recognition control apparatus 31 may be downloaded from another computer via the communication interface 35 or may be read from the storage medium 41 via the media interface 36.

The computer program to be installed in the object recognition control apparatus 31 includes multiple computer programs for causing the object recognition control apparatus 31 to implement multiple functions. The multiple functions include an imaging control unit 37, a determination unit 38, a position calculation unit 39, and an output unit 40.

The imaging control unit 37 controls the visible line image sensor 21 to capture multiple surface line images. The imaging control unit 37 generates a surface image on the basis of the surface line images captured by the visible line image sensor 21. The surface line images are laid without any clearance on a surface image so that a subject that is conveyed along the conveyance path 6 and present in the surface image capturing area 12 appears in the surface image. The surface image further includes multiple pixels and indicates multiple pieces of color information corresponding to the pixels. The pixels are arranged in the surface image without any clearance. Color information corresponding to a certain pixel among the multiple pieces of color information indicates a color of an area corresponding to the certain pixel in the surface of the subject appearing in the surface image, and indicates the red gradation value, the green gradation value, and the blue gradation value of the color.

The imaging control unit 37 further controls the X-ray sensor 22 to capture multiple internal line images. The imaging control unit 37 generates an internal image on the basis of the internal line images captured by the X-ray sensor 22. The internal line images are laid without any clearance on an internal image so that a subject that is conveyed along the conveyance path 6 and present in the internal image capturing area 14 appears in the internal image. The internal image further includes multiple pixels and indicates multiple transmittances corresponding to the pixels. The pixels are arranged in the internal image without any clearance. A transmittance corresponding to a certain pixel among the transmittances indicates a ratio of X-ray transmitted through a portion corresponding to the certain pixel in a subject. In other words, when the outer contour of a subject is formed of a material that transmits X-rays, an internal object contained in the subject appears in the internal image together with the outer contour of the subject.

The determination unit 38 determines whether a subject conveyed along the conveyance path 6 is a battery-containing product on the basis of the surface image and the internal image generated by the imaging control unit 37. When the determination unit 38 determines that the subject is a battery-containing product, the position calculation unit 39 performs image processing on the surface image, to generate imaging-time position information on the basis of the surface image. The imaging-time position information indicates an imaging time when the subject was present in the surface image capturing area 12, and indicates a position where the subject was present at the imaging time. When the determination unit 38 determines that the subject is a battery-containing product, the output unit 40 outputs the imaging-time position information generated by the position calculation unit 39 to the projector control apparatus 32.

The projector control apparatus 32 is connected to the projector 23 so as to communicate information with each other. The projector control apparatus 32 is a computer, and includes a memory and a CPU. In the memory, a computer program to be installed in the projector control apparatus 32 is recorded, and information to be used by the CPU is recorded. The CPU executes a computer program installed in the projector control apparatus 32 to perform information processing. The projector control apparatus 32 further controls the projector 23 so as to perform projection mapping, on the basis of the imaging-time position information that is output from the object recognition control apparatus 31.

Figure 3:
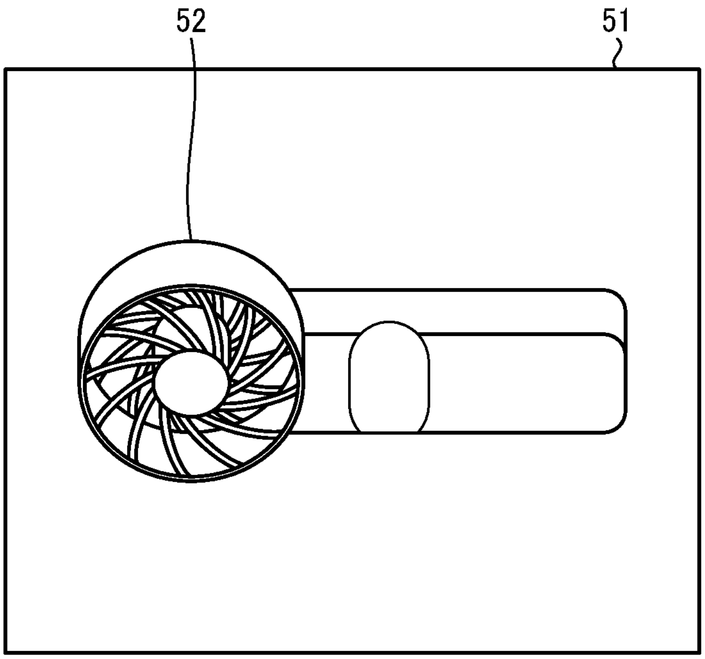
FIG. 3 is a diagram illustrating a surface image as an example of a surface image, according to an embodiment of the present disclosure.

Examples of the battery-containing product removed from the conveyance path 6 in the work area 15 include a portable electric fan, an electric shaver, and a portable charger. As illustrated in FIG. 3, a portable electric fan appears in a surface image 51 as an example of the surface image. FIG. 3 is a diagram illustrating the surface image 51 as an example of the surface image. The surface image 51 includes a portable electric fan surface image 52 representing the surface of the portable electric fan. The portable electric fan appearing in the surface image 51 includes a built-in lithium-ion secondary battery. Since the surface image 51 is generated from multiple surface line images captured using visible light reflected from the surface of a subject, the surface image 51 includes an image of the outer contour forming the surface of the portable electric fan, but does not include an image of the lithium-ion secondary battery that is built in the portable electric fan.

Figure 4:
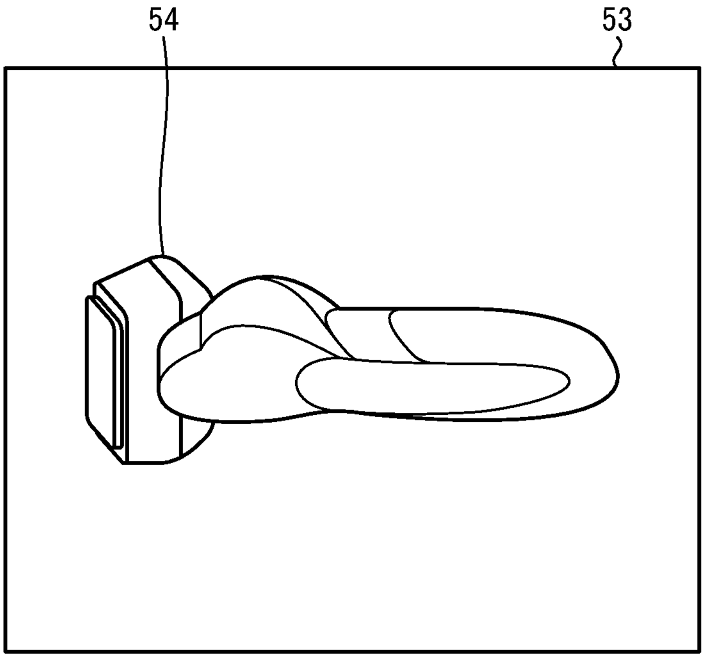
FIG. 4 is a diagram illustrating a surface image as another example of a surface image, according to an embodiment of the present disclosure.

As illustrated in FIG. 4, an electric shaver appears in a surface image 53 as another example of the surface image. FIG. 4 is a diagram illustrating the surface image 53 as another example of the surface image. The surface image 53 includes an electric shaver surface image 54 representing the surface of the electric shaver. The electric shaver appearing in the surface image 53 includes a built-in lithium-ion secondary battery. Since the surface image 53 is generated from multiple surface line images captured using visible light reflected from the surface of a subject, the surface image 53 includes an image of the outer contour forming the surface of the electric shaver, but does not include an image of the lithium-ion secondary battery that is built in the electric shaver.

Figure 5:
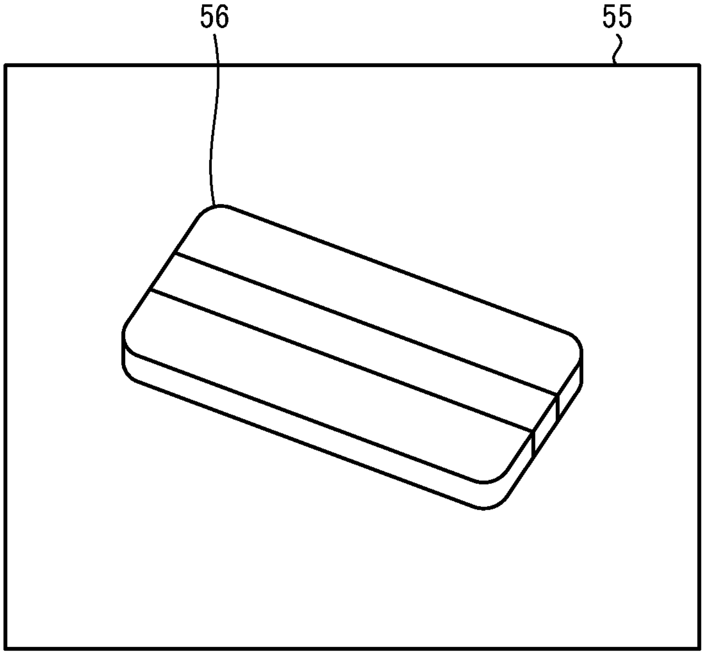
FIG. 5 is a diagram illustrating a surface image as a still another example of a surface image, according to an embodiment of the present disclosure.

As illustrated in FIG. 5, a portable charger appears in a surface image 55 as a still another example of the surface image. FIG. 5 is a diagram illustrating the surface image 55 as a still another example of the surface image. The surface image 55 includes a portable charger surface image 56 representing the surface of the portable charger. The portable charger appearing in the surface image 55 includes a built-in lithium-ion secondary battery. Since the surface image 55 is generated from multiple surface line images captured using visible light reflected from the surface of a subject, the surface image 55 includes an image of the outer contour forming the surface of the portable charger, but does not include an image of the lithium-ion secondary battery that is built in the portable charger.

Figure 6:
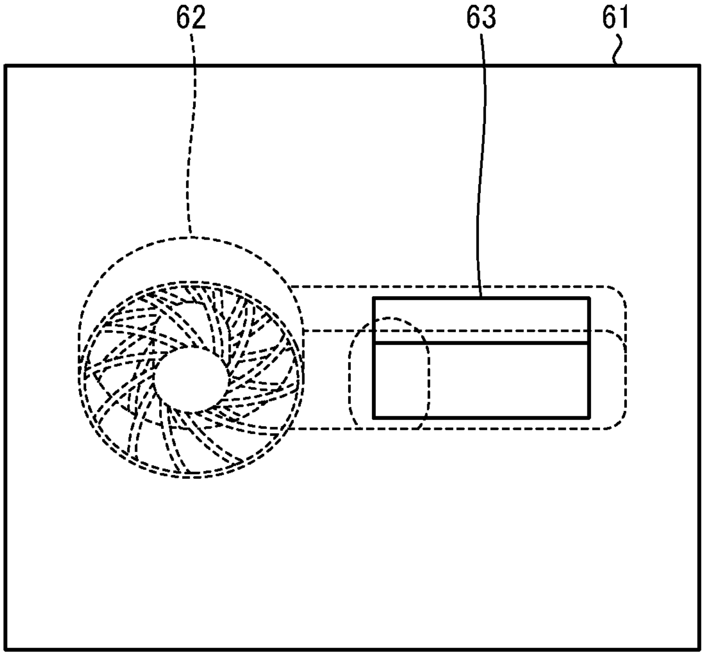
FIG. 6 is a diagram illustrating an internal image as an example of an internal image, according to an embodiment of the present disclosure.

As illustrated in FIG. 6, the portable electric fan appears in an internal image 61 as an example of the internal image. FIG. 6 is a diagram illustrating the internal image 61 as an example of the internal image. The internal image 61 includes a portable electric fan internal image 62 and a battery internal image 63. The portable electric fan internal image 62 represents the portable electric fan. The battery internal image 63 represents the lithium-ion secondary battery that is built in the portable electric fan. In other words, since the internal image 61 is generated using X-rays that transmit through a subject, the internal image 61 includes an image of the outer contour of the portable electric fan and an image of the lithium-ion secondary battery that is built in the portable electric fan.

Figure 7:
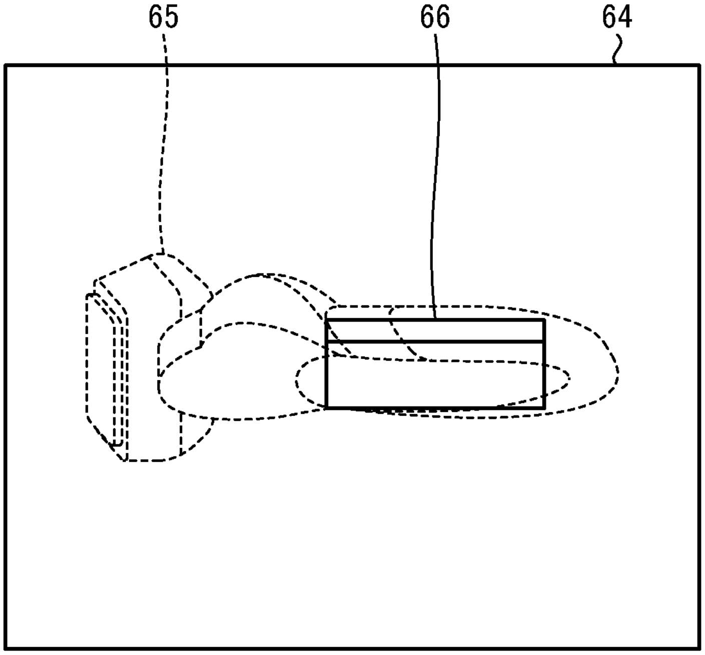
FIG. 7 is a diagram illustrating an internal image as an another example of an internal image, according to an embodiment of the present disclosure.

As illustrated in FIG. 7, the electric shaver appears in an internal image 64 as another example of the internal image. FIG. 7 is a diagram illustrating the internal image 64 as an another example of the internal image. The internal image 64 includes an electric shaver internal image 65 and a battery internal image 66. The electric shaver internal image 65 represents the electric shaver. The battery internal image 66 represents the lithium-ion secondary battery that is built in the electric shaver. In other words, since the internal image 64 is generated using X-rays that transmit through a subject, the internal image 64 includes an image of the outer contour of the electric shaver and an image of the lithium-ion secondary battery that is built in the electric shaver.

Figure 8:
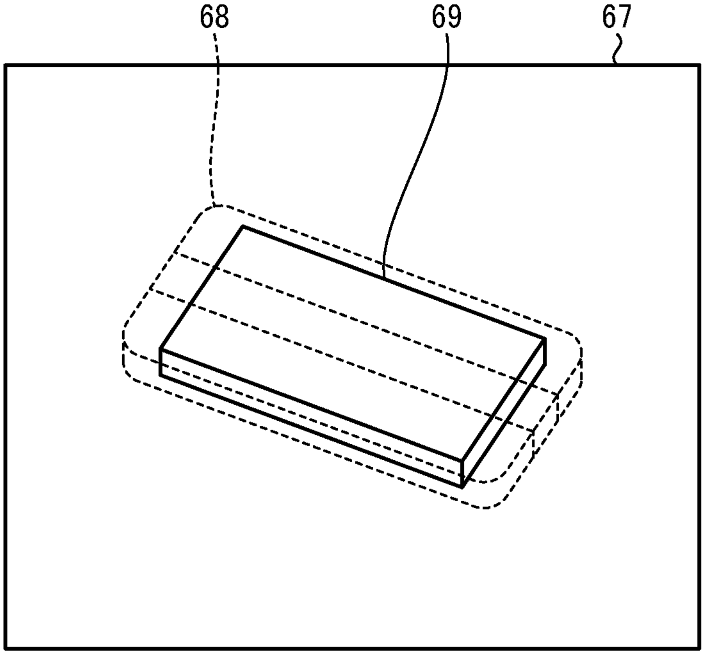
FIG. 8 is a diagram illustrating an internal image as a still another example of an internal image, according to an embodiment of the present disclosure.

As illustrated in FIG. 8, the portable charger appears in an internal image 67 as a still another example of the internal image. FIG. 8 is a diagram illustrating the internal image 67 as a still another example of the internal image. The internal image 67 includes a portable charger internal image 68 and a battery internal image 69. The portable charger internal image 68 represents the portable charger. The battery internal image 69 represents the lithium-ion secondary battery that is built in the portable charger. In other words, since the internal image 67 is generated using X-rays that transmit through a subject, the internal image 67 includes an image of the outer contour of the portable charger and an image of the lithium-ion secondary battery that is built in the portable charger.

The imaging control unit 37 generates, when the surface image is generated, the internal image such that a subject appearing in surface image appears in the internal image and such that a position where an internal view representing the subject appears in the internal image matches a position where a surface view representing the subject appears in the surface image. For example, the imaging control unit 37 generates, when the surface image 51 is generated, the internal image 61 such that a position where the portable electric fan internal image 62 appears in the internal image 61 matches a position where the portable electric fan surface image 52 appears in the surface image 51. The imaging control unit 37 generates, when the surface image 53 is generated, the internal image 64 such that a position where the electric shaver internal image 65 appears in the internal image 64 matches a position where the electric shaver surface image 54 appears in the surface image 53. The imaging control unit 37 generates, when the surface image 55 is generated, the internal image 67 such that a position where the portable charger internal image 68 appears in the internal image 67 matches a position where the portable charger surface image 56 appears in the surface image 55.

Figure 9:
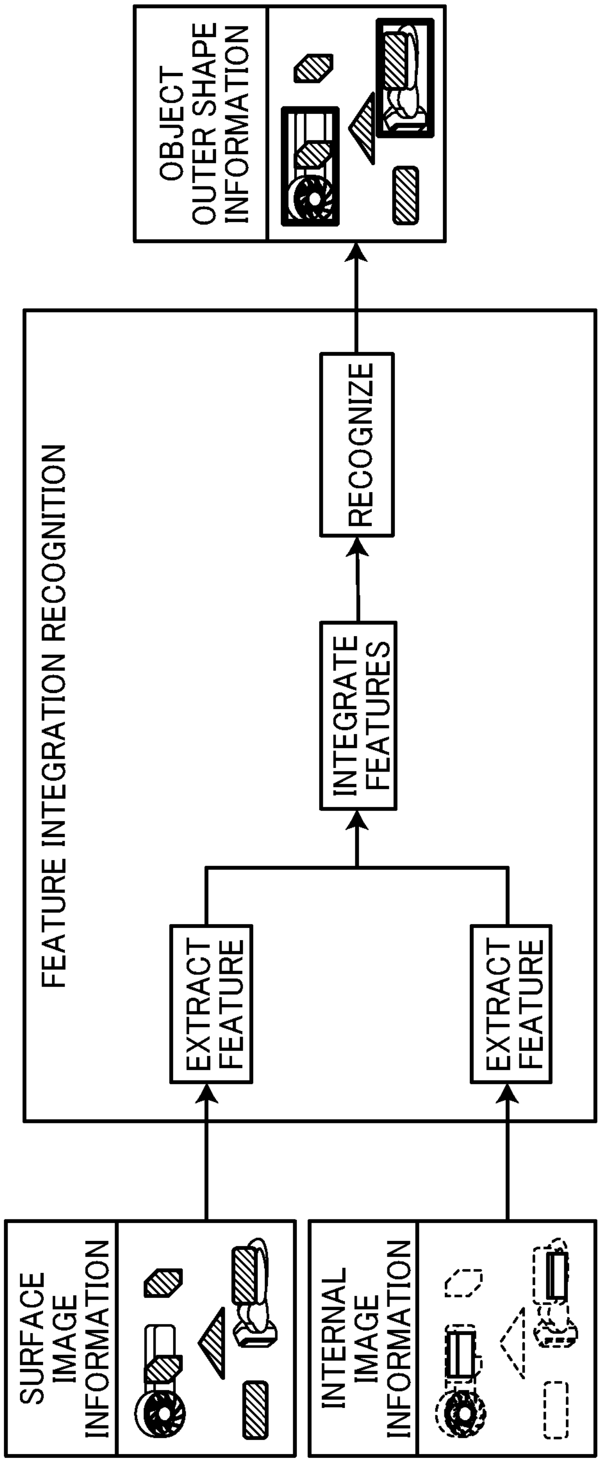
FIG. 9 is a schematic diagram illustrating a determination process by a determination unit of the object processing apparatus according to Embodiment 1.

FIG. 9 is a schematic diagram illustrating a determination process by the determination unit 38 of the object processing apparatus 1 according to Embodiment 1. The determination unit 38 extracts features from the surface image and the internal image. Examples of the features to be extracted include color information and transmittances of pixels. Alternatively, the average, variance, or histogram of pixel values, or a feature amount extracted from a layer of the convolutional neural network (CNN) may be used, for example. The determination unit 38 integrates the features of the images and performs recognition processing on the basis of the integrated feature information. For example, the determination unit 38 determines whether a subject of the surface image and the internal image is a battery-containing product using a learning model for integrated information generated by machine learning. As a result, by integrating the features of both the surface image and the internal image, the strengths and weaknesses of the images are complemented. This enhances recognition accuracy.

Figure 10:
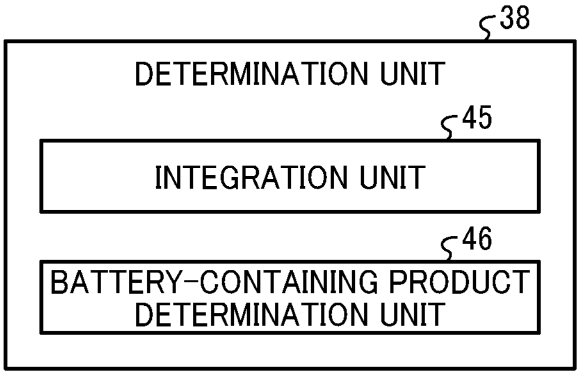
FIG. 10 is a block diagram illustrating the determination unit of the object processing apparatus according to Embodiment 1.

For example, as illustrated in FIG. 10, the determination unit 38 includes an integration unit 45 and a battery-containing product determination unit 46. FIG. 10 is a block diagram illustrating the determination unit 38. The integration unit 45 generates integrated information on the basis of the surface image and the internal image generated by the imaging control unit 37. The integrated information indicates both feature information indicated by the surface image and feature information indicated by the internal image. For example, the integrated information indicates both the color of the surface of a subject appearing in the surface image and the X-ray transmittance of a subject appearing in the internal image.

The battery-containing product determination unit 46 determines whether a subject indicated by the integrated information is a battery-containing product on the basis of the integrated information generated by the integration unit 45, using a learning model for integrated information generated by machine learning.

The operation of the waste sorting apparatus 2 includes a conveyance operation and a battery-containing product removal operation.

Conveyance Operation In the conveying operation, first, the belt conveyor 3 starts in response to an operation by a user to the belt conveyor 3. In response to the start of belt conveyor 3, the belt driver of the belt conveyor 3 moves the belt 5 such that the conveyance path facing portion 8 of the belt 5 translates in the conveyance direction 7 at a predetermined constant conveyance speed. The user further places waste on the conveyance path facing portion 8 of the belt 5 such that the waste is placed in the object supply area 11 of the conveyance path 6.

The waste placed in the object supply area 11 is conveyed in the conveyance direction 7 along the conveyance path 6 at the conveyance speed as the conveyance path facing portion 8 translates. Thus, the waste is placed in the surface image capturing area 12. The waste placed in the surface image capturing area 12 is further conveyed in the conveyance direction 7 at the conveyance speed along the conveyance path 6 as the conveyance path facing portion 8 translates. Thus, the waste is placed in the internal image capturing area 14. The waste placed in the internal image capturing area 14 is further conveyed in the conveyance direction 7 at the conveyance speed along the conveyance path 6 as the conveyance path facing portion 8 translates. Thus, the waste is placed in the work area 15. The waste placed in the work area 15 is discharged from the conveyance path 6 as the conveyance path facing portion 8 translates and supplied to a shredder. The shredder shreds the waste supplied from the belt conveyor 3 into small pieces.

The waste may be a battery-containing product having a battery built therein. When a short-circuit occurs in a lithium-ion secondary battery, which is the battery, or when a shock is applied to the lithium-ion secondary battery, a fire may occur. Batteries other than the lithium-ion secondary battery may ignite due to occurrence of a short circuit. Accordingly, when the battery-containing product is supplied from the belt conveyor 3 to the shredder, the battery-containing product is shred and may cause a fire.

Battery-Containing Product Removal Operation

Figure 11:
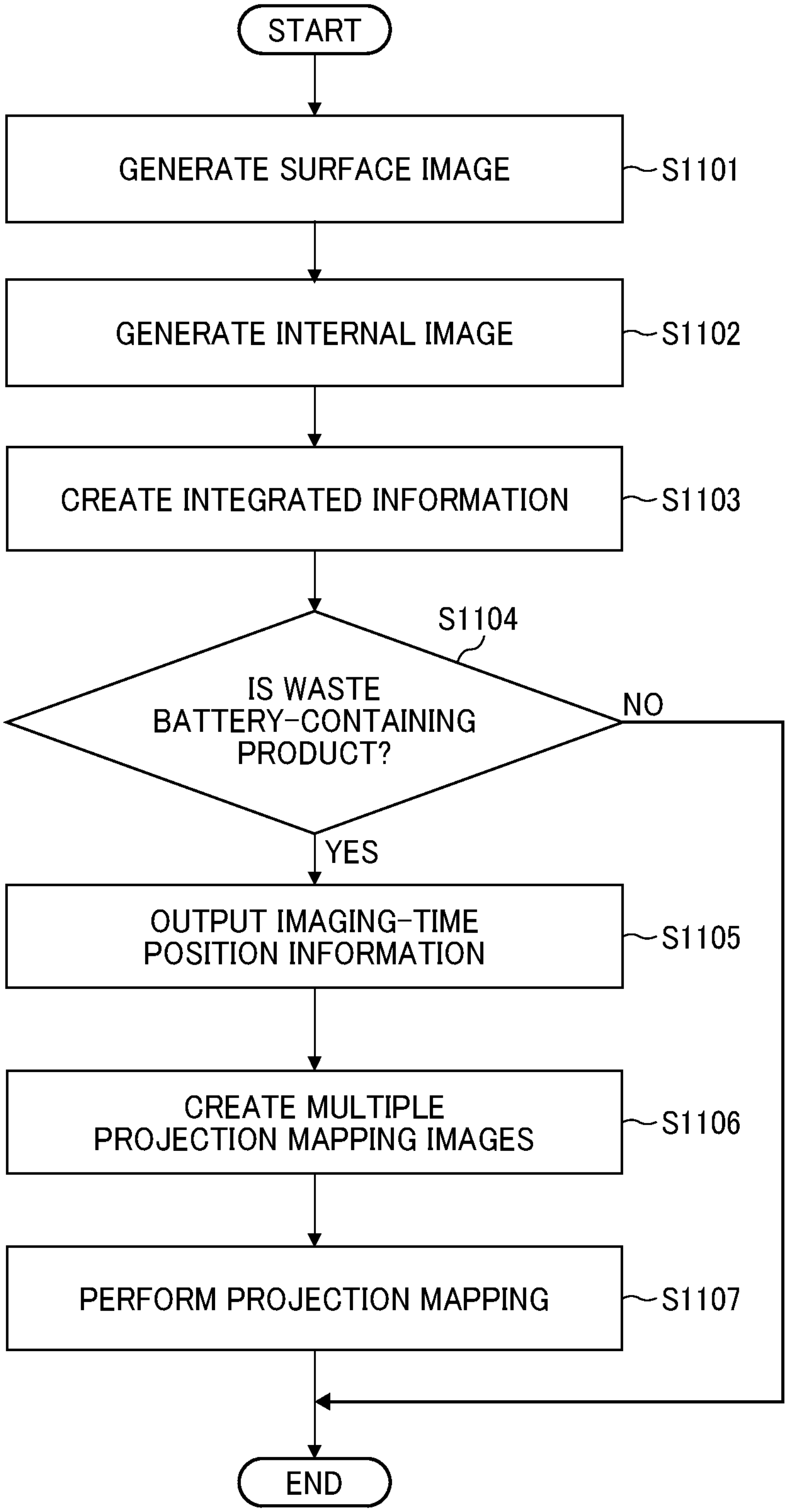
FIG. 11 is a flowchart of a process performed by the object processing apparatus according to Embodiment 1.

A process performed by the object processing apparatus 1 according to the present is described with reference to FIG. 11. The battery-containing product removal operation is performed while the conveyance operation is being performed. The object recognition control apparatus 31 controls the visible line image sensor 21 to capture multiple surface line images. The object recognition control apparatus 31 generates a surface image in which the surface of waste conveyed along the conveyance path 6 and placed in the surface image capturing area 12 appears, on the basis of the surface line images captured by the visible line image sensor 21 (S1101). The object recognition control apparatus 31 controls the X-ray sensor 22 to capture multiple internal line images. The object recognition control apparatus 31 generates an internal image in which the outer contour of the waste conveyed along the conveyance path 6 and placed in the internal image capturing area 14 and an internal object in the waste appear, on the basis of the internal line images captured by the X-ray sensor 22 (S1102). The internal image is generated such that a position where an internal view representing the waste appears in the internal image matches a position where a surface view representing the waste appears in the surface image.

The object recognition control apparatus 31 creates integrated information on the basis of the surface image and the internal image (S1103). The object recognition control apparatus 31 determines whether waste indicated by the integrated information is a battery-containing product on the basis of the integrated information, using a learning model for integrated information (S1104).

When the object recognition control apparatus 31 determines that the waste indicated by the integrated information is not a battery-containing product (S1104: No), the process ends.

When the object recognition control apparatus 31 determines that the waste indicated by the integrated information is a battery-containing product (S1104: Yes), the object recognition control apparatus 31 performs image processing on the surface image, to calculate imaging-time position information. The imaging-time position information indicates an imaging time when the battery-containing product was present in the surface image capturing area 12, and indicates a position where the battery-containing product was present at the imaging time. When the object recognition control apparatus 31 determines that the waste indicated by the integrated information is a battery-containing product, the object recognition control apparatus 31 further outputs the calculated imaging-time position information to the projector control apparatus 32 (S1105).

The projector control apparatus 32 creates multiple projection mapping images corresponding to multiple times on the basis of the conveyance speed and the imaging-time position information (S1106). Each of the times is included in a time period during which the battery-containing product is present in the work area 15. A particular projection mapping image corresponding to a certain time among the projection mapping images is created such that an area where the battery-containing product is present in the work area 15 is conspicuously visually recognizable by projecting the particular project mapping image onto the work area 15 at the certain time. Examples of the projection mapping image include an image that illuminates the battery-containing product more brightly than portions in the work area 15 other than the battery-containing product. The projector control apparatus 32 controls the projector 23 to perform projection mapping for projecting the projection mapping images onto the work area 15 at the multiple times (S1107).

The worker 16 searches multiple pieces of waste that is conveyed along the conveyance path 6 and placed in the work area 15 for a battery-containing product. When the worker 16 finds out a battery-containing product, the worker removes the found battery-containing product from the conveyance path 6. The waste sorting apparatus 2 can make it easy for the worker 16 to search for a battery-containing product by the projection mapping that makes the battery-containing product conspicuously visually recognizable, and thus can reduce the frequency with which the worker 16 overlooks the battery-containing product. Since the waste sorting apparatus 2 reduces the frequency with which the worker 16 overlooks the battery-containing product, the waste sorting apparatus 2 can reduce the frequency with which the battery-containing product is supplied to the shredder. Since the waste sorting apparatus 2 reduces the frequency with which the battery-containing product is supplied to the shredder, the waste sorting apparatus 2 can reduce the frequency of ignition in the shredder.

When the object recognition control apparatus 31 makes an erroneous determination such as a determination that waste that is not a battery-containing product is a battery-containing product and a determination that a battery-containing product is not a battery-containing product, the user creates retraining data. The retraining data includes data associating the integrated information used when the waste that is not a battery-containing product is erroneously determined as a battery-containing product with a determination of "being not a battery-containing product." The retraining data further includes data associating the integrated information used when a battery-containing product is erroneously determined as not a battery-containing product with a determination of "being a battery-containing product." The user retrains the learning model for integrated information using the retraining data to create a new learning model for integrated information. The learning model for integrated information to be used when the object recognition control apparatus 31 determines whether waste is a battery-containing product is updated to the created new learning model for integrated information according to an operation by a user. The update of the learning model for integrated information enables the object processing apparatus 1 to further reduce the frequency of erroneous determinations.

Figure 12:
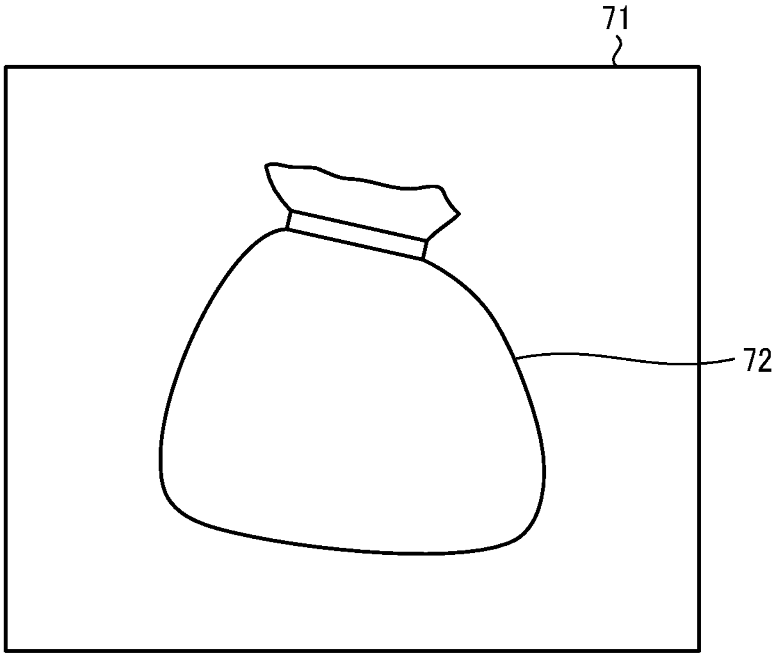
FIG. 12 is a diagram illustrating a surface image generated when a battery-containing product in a bag is conveyed along a conveyance path, according to an embodiment of the present disclosure.

As illustrated in FIG. 12, when a battery-containing product in a bag is conveyed along the conveyance path 6, a surface image 71 generated by the object recognition control apparatus 31 includes a bag surface image 72 representing the bag. FIG. 12 is a diagram illustrating the surface image 71 generated when a battery-containing product in a bag is conveyed along the conveyance path 6. The surface image 71 is generated using visible light reflected from the surface of a subject. For this reason, when the visible light does not transmit through the bag, the surface image 71 includes an image of the bag containing the battery-containing product, but does not include an image the battery-containing product in the bag.

Figure 13:
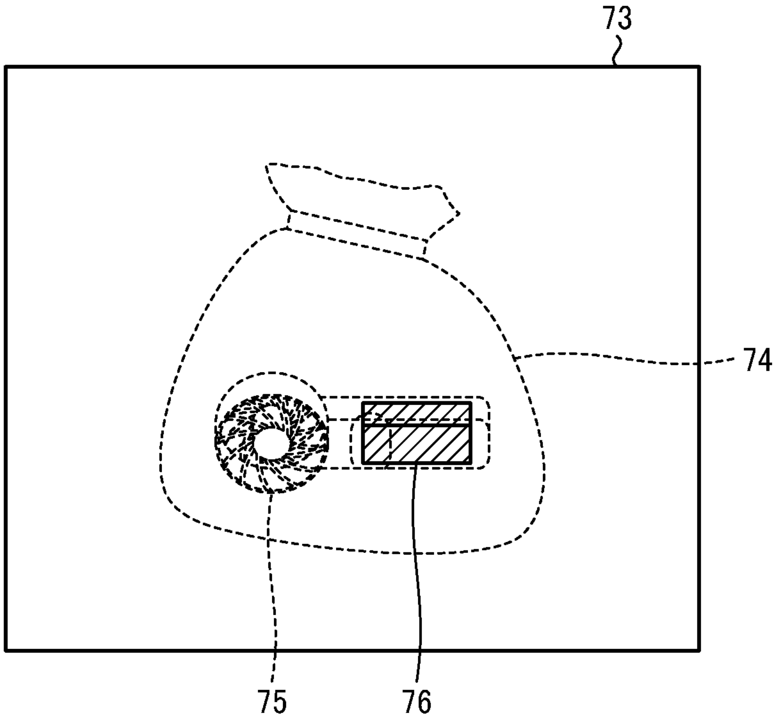
FIG. 13 is a diagram illustrating an internal image generated when a battery-containing product in a bag is conveyed along a conveyance path, according to an embodiment of the present disclosure.

As illustrated in FIG. 13, when the battery-containing product in the bag is conveyed along the conveyance path 6, an internal image 73 generated by the object recognition control apparatus 31 includes a bag internal image 74, a portable electric fan internal image 75, and a battery internal image 76. FIG. 13 is a diagram illustrating the internal image 73 generated when the battery-containing product in the bag is conveyed along the conveyance path 6. The bag internal image 74 represents the bag. The portable electric fan internal image 75 represents the outer contour of a portable electric fan, which is the battery-containing product in the bag. The battery internal image 76 represents a battery that is built in the portable electric fan. In other words, when X-rays transmit through the bag, in the internal image 73, the bag appears, and the battery-containing product and the battery also appear.

An object processing apparatus according to Comparative Example 1 has the same or substantially the same configuration as the configuration of the object processing apparatus 1 according to Embodiment 1 except that the determination unit 38 of the object processing apparatus 1 according to Embodiment 1 is replaced with another determination unit. The object processing apparatus according to Comparative Example 1 determines whether waste conveyed along the conveyance path 6 is a battery-containing product on the basis of only a surface image without using an internal image. Accordingly, the object processing apparatus of Comparative Example 1 may erroneously determine that a portable electric fan in a bag is not a battery-containing product since the portable electric fan does not appear in the surface image 71. Even when the portable electric fan does not appear in the surface image 71, the object processing apparatus 1 can determine that the portable electric fan in the bag is a battery-containing product on the basis of the integrated information since the portable electric fan appears in the internal image 73. Accordingly, compared to the object processing apparatus according to Comparative Example 1, the object processing apparatus 1 can reduce the frequency of erroneous determination that a bag containing a battery-containing product is not a battery-containing product.

Figure 14:
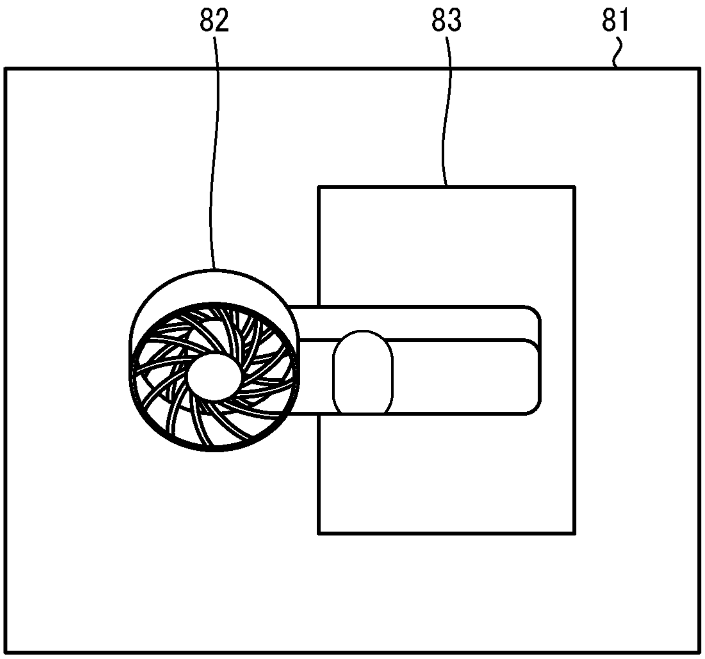
FIG. 14 is a diagram illustrating a surface image generated when a battery-containing product on an iron plate is conveyed along a conveyance path, according to an embodiment of the present disclosure.

As illustrated in FIG. 14, when a battery-containing product on an iron plate is conveyed along the conveyance path 6, a surface image 81 generated by the object recognition control apparatus 31 includes a portable electric fan surface image 82 and an iron plate surface image 83. FIG. 14 is a diagram illustrating the surface image 81 generated when a battery-containing product on an iron plate is conveyed along the conveyance path 6. The portable electric fan surface image 82 represents the portable electric fan. The iron plate surface image 83 represents the iron plate laid under the portable electric fan.

Figure 15:
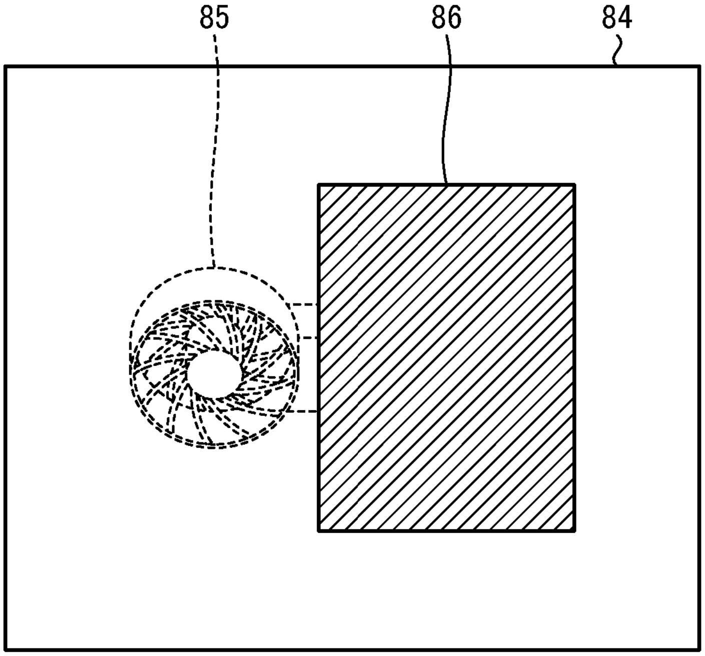
FIG. 15 is a diagram illustrating an internal image generated when a battery-containing product on an iron plate is conveyed along a conveyance path, according to an embodiment of the present disclosure.

As illustrated in FIG. 15, when the battery-containing product on the iron plate is conveyed along the conveyance path 6, an internal image 84 generated by the object recognition control apparatus 31 includes a portable electric fan internal image 85 and an iron plate internal image 86. FIG. 15 is a diagram illustrating the internal image 84 generated when the battery-containing product on the iron plate is conveyed along the conveyance path 6. The iron plate internal image 86 represents the iron plate laid under the portable electric fan. The portable electric fan internal image 85 represents a portion of the portable electric fan that is not overlapped with the iron plate, but does not represent a portion of the portable electric fan that is overlapped with the iron plate. Accordingly, when the iron plate blocks X-rays and when a battery that is built in the battery-containing product overlaps the iron plate, the battery does not appear in the internal image 84.

An object processing apparatus according to Comparative Example 2 has the same or substantially the same configuration as the configuration of the object processing apparatus 1 according to Embodiment 1 except that the determination unit 38 of the object processing apparatus 1 according to Embodiment 1 is replaced with a still another determination unit. The object processing apparatus according to Comparative Example 2 determines whether waste conveyed along the conveyance path 6 is a battery-containing product on the basis of only an internal image without using a surface image. Accordingly, the object processing apparatus of Comparative Example 2 may erroneously determine that a battery-containing product on a plate that blocks X-rays is not a battery-containing product. Even when the entire portable electric fan does not appear in the internal image 84, the object processing apparatus 1 can determine that the battery-containing product on the plate that blocks X-rays is a battery-containing product on the basis of the integrated information since the entire portable electric fan appears in the surface image 81. Accordingly, compared to the object processing apparatus according to Comparative Example 2, the object processing apparatus 1 can reduce the frequency of erroneous determination that a battery-containing product on a plate that blocks X-rays is not a battery-containing product.

Effects of Object Processing Apparatus 1 According to Embodiment 1

The object processing apparatus 1 according to Embodiment 1 includes the visible line image sensor 21, the X-ray sensor 22, the determination unit 38, and the projector 23. The visible line image sensor 21 captures a surface image in which the surface of waste appears. The X-ray sensor 22 captures an internal image in which an internal object inside the waste appears. The determination unit 38 determines whether the waste is a battery-containing product that includes a built-in battery on the basis of the surface image and the internal image. The projector 23 operates on the basis of the determination result obtained by the determination unit 38. With this configuration, the object processing apparatus 1 according to Embodiment 1 can reduce the frequency of erroneously determining that a battery-containing product is not a battery-containing product or erroneously determining that waste that is not a battery-containing product is a battery-containing product.

Further, the determination unit 38 of the object processing apparatus 1 according to Embodiment 1 determines whether waste is a battery-containing product on the basis of the integrated information obtained by integrating the surface image and the internal image. With this configuration, the number of information dimensions used in the determination by the object processing apparatus 1 according to Embodiment 1 increases. This enhances the determination accuracy, compared to when each of the surface image and the internal image is used alone in the determination.

Further, the object processing apparatus 1 according to Embodiment 1 includes the position calculation unit 39 and the projector control apparatus 32. When the determination unit 38 determines that the waste is a battery-containing product, the position calculation unit 39 calculates a position where the battery-containing product is present on the basis of the surface image. The projector control apparatus 32 controls the projector 23 on the basis of the calculated position to project, in the work area 15, video indicating an area where the battery-containing product is present. With this configuration, the object processing apparatus 1 according to Embodiment 1 makes it easy for the worker 16 to find out a battery-containing product from multiple pieces of waste. The object processing apparatus 1 according to Embodiment 1 does not have to include another means for detecting the position of the battery-containing product in the work area 15 in addition to the visible line image sensor 21. This reduces the number of components and the manufacturing cost.

The description given above is of a case where the internal image used by the object processing apparatus 1 according to Embodiment 1 is generated such that a position where an internal view representing a certain piece of waste appears in the internal image matches a position where a surface view representing the certain piece of waste appears in the surface image. Alternatively, the internal image may be generated such that the position where the internal view representing the certain piece of waste appears in the internal image does not match the position where the surface view representing the certain piece of waste appears in the surface image. In this case, the object recognition control apparatus 31 calculates a position where the waste appears in the surface image and a position where the waste appears in the internal image by image processing, and creates the integrated information on the basis of the calculated positions. With this configuration, even when the internal image is generated in a manner that a position where an internal view representing a certain piece of waste appears in the internal image does not match a position where a surface view representing the certain piece of waste appears in the surface image, the object recognition control apparatus 31 can reduce the frequency of erroneous determination using the integrated information.

Embodiment 2

Figure 16:
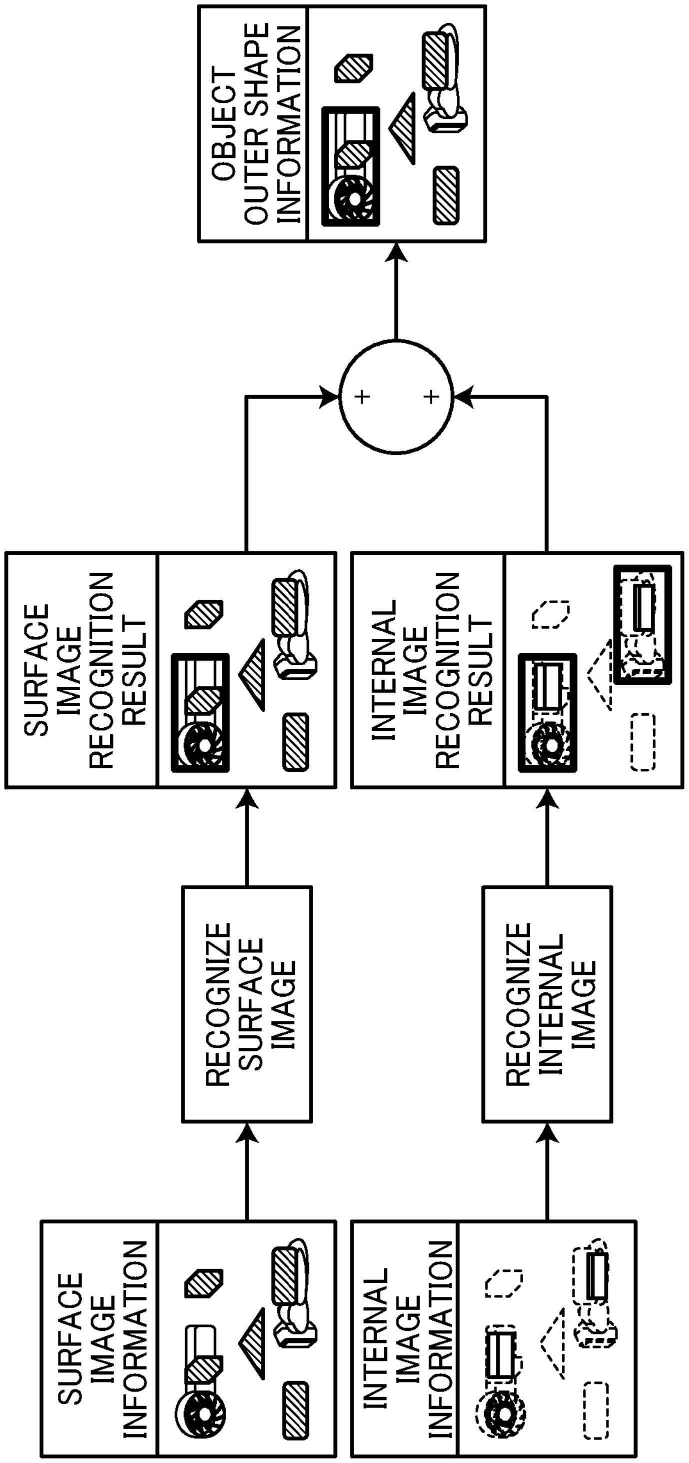
FIG. 16 is a schematic diagram illustrating a determination process by a determination unit of an object processing apparatus according to Embodiment 2.

As illustrated in FIG. 16, in an object processing apparatus according to Embodiment 2, the process by the determination unit 38 of the object processing apparatus 1 according to Embodiment 1 is replaced with a different process. FIG. 16 is a schematic diagram illustrating a determination process by the object processing apparatus according to Embodiment 2. The object processing apparatus according to Embodiment 2 performs image recognition on each of the surface image and the internal image, and integrates the results of the image recognition to determine whether waste is a battery-containing product. In this case, the object processing apparatus according to Embodiment 2 can reduce erroneous determination by making a final determination by ANDing the image recognition results of both the surface image and the internal image.

Figure 17:
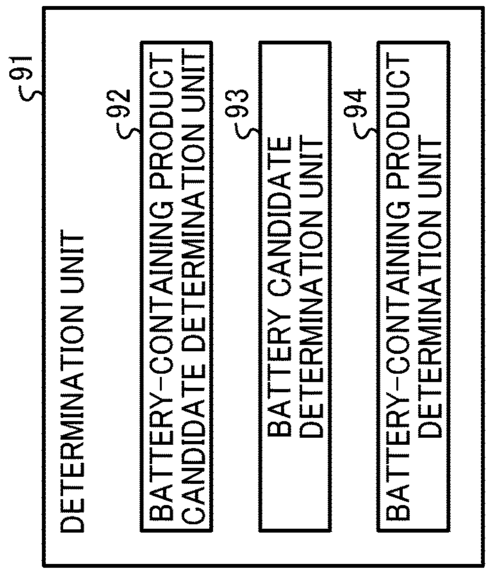
FIG. 17 is a block diagram illustrating the determination unit of the object processing apparatus according to Embodiment 2.

For example, as illustrated in FIG. 17, the object processing apparatus according to Embodiment 2 has the same or substantially the same configuration as the configuration of the object processing apparatus 1 according to Embodiment 1 except that the determination unit 38 of the object processing apparatus 1 according to Embodiment 1 is replaced with a determination unit 91. FIG. 17 is a block diagram illustrating the determination unit 91 of the object processing apparatus according to Embodiment 2. The determination unit 91 includes a battery-containing product candidate determination unit 92, a battery candidate determination unit 93, and a battery-containing product determination unit 94.

The battery-containing product candidate determination unit 92 determines whether a battery-containing product candidate appears in a surface image generated by the imaging control unit 37, using a learning model for internal images, the learning model being generated by machine learning. The battery-containing product candidate is a product that possibly includes a built-in battery. Examples of the battery-containing product candidate include a product whose appearance is equivalent to the appearance of a portable electric fan, an electric shaver, or a portable charger. The battery candidate determination unit 93 determines whether a battery candidate appears in a surface image generated by the imaging control unit 37, using a learning model for internal images, the learning model being generated by machine learning. The battery candidate is an object that is possibly a battery. Examples of the battery candidate include an object that is formed of a material that does not transmit X-rays and has a cylindrical shape or a rectangular parallelepiped shape.

When the battery-containing product candidate determination unit 92 determines that a battery-containing product candidate appears in a surface image and when the battery candidate determination unit 93 determines that a battery candidate appears in an internal image, the battery-containing product determination unit 94 determines that the waste appearing in the surface image and the internal image is a battery-containing product. When the battery-containing product candidate determination unit 92 determines that no battery-containing product candidate appears in a surface image or when the battery candidate determination unit 93 determines that no battery candidate appears in an internal image, the battery-containing product determination unit 94 determines that the waste appearing in the surface image and the internal image is not a battery-containing product.

The object processing apparatus according to Comparative Example 1, which determines whether waste conveyed along the conveyance path 6 is a battery-containing product on the basis of only a surface image, may erroneously determine a battery-containing product candidate from which a battery has been removed as a battery-containing product. The object processing apparatus according to Embodiment 2 determines that the waste is not a battery-containing product even when a battery-containing product candidate appears in the surface image, when no battery candidate appears in the internal image. Thus, the object processing apparatus according to Embodiment 2 can reduce the frequency of erroneous determination that a battery-containing product candidate from which a battery has been removed is a battery-containing product.

The object processing apparatus according to Comparative Example 2, which determines whether waste conveyed along the conveyance path 6 is a battery-containing product on the basis of only an internal image, may erroneously determine a product that includes a battery candidate, which is not actually a battery, as a battery-containing product. The object processing apparatus according to Embodiment 2 determines that the waste is not a battery-containing product even when a battery candidate appears in the internal image, when no battery-containing product candidate appears in the surface image. Thus, the object processing apparatus according to Embodiment 2 can reduce the frequency of erroneous determination that waste that is not a battery-containing product is a battery-containing product. In other words, the waste sorting apparatus including the object processing apparatus according to Embodiment 2 can reduce the frequency of erroneously determining waste that is not a battery-containing product as a battery-containing product. This reduces the frequency of misleadingly presenting to the worker 16 that waste that is not a battery-containing product is a battery-containing product.

Embodiment 3

An object processing apparatus according to Embodiment 3 has the same or substantially the same configuration as the configuration of the object processing apparatus according to Embodiment 2 except that the battery-containing product determination unit 94 of the object processing apparatus according to Embodiment 2 is replaced with another battery-containing product determination unit. When the battery-containing product candidate determination unit 92 determines that a battery-containing product candidate appears in a surface image or when the battery candidate determination unit 93 determines that a battery candidate appears in an internal image, the battery-containing product determination unit determines that the waste appearing in the surface image and the internal image is a battery-containing product. When the battery-containing product candidate determination unit 92 determines that no battery-containing product candidate appears in a surface image and when the battery candidate determination unit 93 determines that no battery candidate appears in an internal image, the battery-containing product determination unit determines that the waste appearing in the surface image and the internal image is not a battery-containing product.

Accordingly, compared to the object processing apparatus according to Embodiment 2, the object processing apparatus according to Embodiment 3 can more reliably reduce the frequency of erroneous determination that a battery-containing product is not a battery-containing product. Thus, compared to the waste sorting apparatus including the object processing apparatus according to Embodiment 2, the waste sorting apparatus including the object processing apparatus according to Embodiment 3 can more reliably prevent a battery-containing product from being supplied to the shredder. In other words, compared to the waste sorting apparatus including the object processing apparatus according to Embodiment 2, the waste sorting apparatus including the object processing apparatus according to Embodiment 3 can more reliably prevent ignition in the shredder.

Embodiment 4

Figure 18:
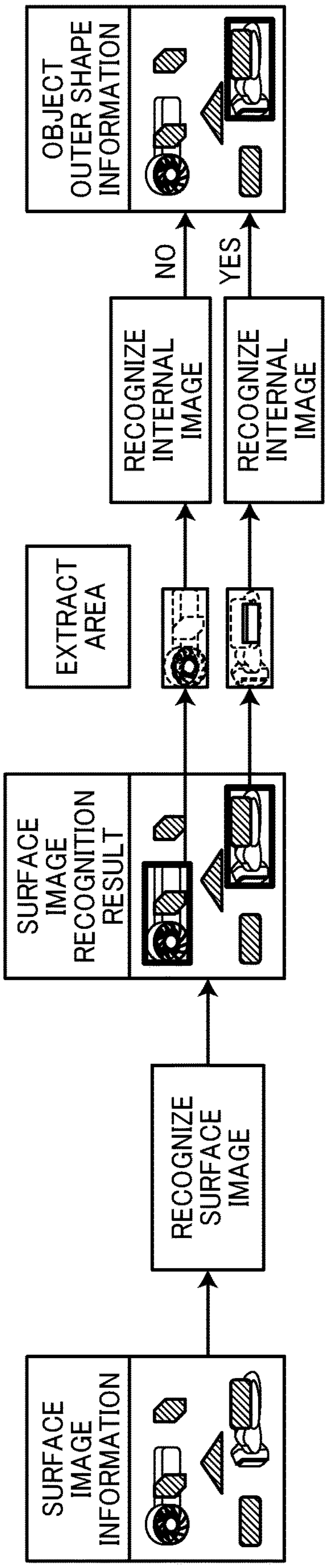
FIG. 18 is a schematic diagram illustrating a determination process by a determination unit of an object processing apparatus according to Embodiment 4.

As illustrated in FIG. 18, in an object processing apparatus according to Embodiment 4, the process by the determination unit 38 of the object processing apparatus 1 according to Embodiment 1 is replaced with a different process. FIG. 18 is a schematic diagram illustrating a determination process by the object processing apparatus according to Embodiment 4. The object processing apparatus according to Embodiment 4 first performs image recognition of a surface image to extract an area recognized as a battery-containing product from an internal image. Subsequently, the object processing apparatus performs image recognition to recheck the internal image of the extracted area, and thus makes a final determination as to whether the waste is a battery-containing product. The object processing apparatus according to Embodiment 4 can exclude waste whose appearance is like a battery-containing product from a battery-containing product, when a battery is removed from the waste.

Figure 19:
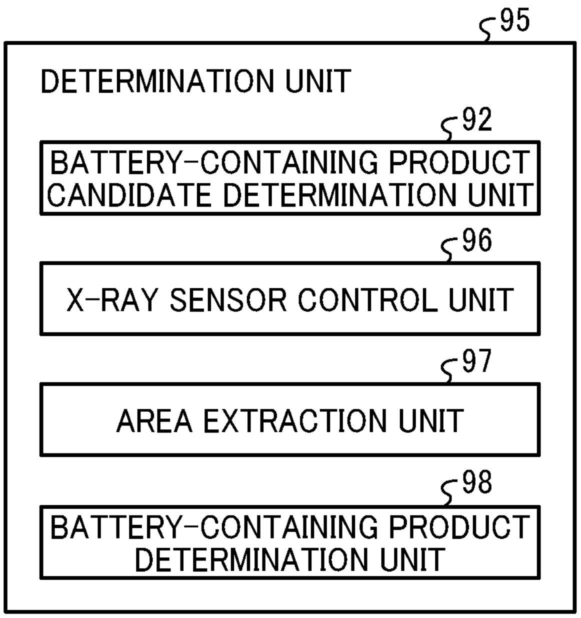
FIG. 19 is a block diagram illustrating the determination unit of the object processing apparatus according to Embodiment 4.

For example, as illustrated in FIG. 19, the object processing apparatus according to Embodiment 4 has the same or substantially the same configuration as the configuration of the object processing apparatus according to Embodiment 2 except that the determination unit 38 of the object processing apparatus 1 according to Embodiment 1 is replaced with a determination unit 95. FIG. 19 is a block diagram illustrating the determination unit 95 of the object processing apparatus according to Embodiment 4. The determination unit 95 includes the battery-containing product candidate determination unit 92, an X-ray sensor control unit 96, an area extraction unit 97, and a battery-containing product determination unit 98.

The battery-containing product candidate determination unit 92 determines whether a battery-containing product candidate appears in a surface image generated by the imaging control unit 37, using a learning model for surface images, the learning model being generated by machine learning. When the battery-containing product candidate determination unit 92 determines that no battery-containing product candidate appears in the surface image, the X-ray sensor control unit 96 controls the X-ray sensor 22 not to project X-rays toward the internal image capturing area 14. The area extraction unit 97 extracts a partial image from the internal image generated by the imaging control unit 37. A position where the partial image is present in the internal image matches a position where the surface image representing the battery-containing product candidate is present in the surface image.

The battery-containing product determination unit 98 determines whether a battery candidate appears in the partial image extracted by the area extraction unit 97. When the battery-containing product determination unit 98 determines that a battery candidate appears in the partial image, the determination unit 95 determines that the waste appearing in the surface image and the internal image is a battery-containing product. When the battery-containing product determination unit 98 determines that no battery candidate appears in the partial image, the determination unit 95 determines that the waste appearing in the surface image and the internal image is not a battery-containing product.

In the same or substantially the same manner as the object processing apparatus according to Embodiment 2, the object processing apparatus according to Embodiment 4 can also reduce the frequency of erroneously determining that a battery-containing product is not a battery-containing product or erroneously determining that waste that is not a battery-containing product is a battery-containing product. Further, the X-ray sensor 22 of the object processing apparatus according to Embodiment 4 does not emit X-rays on the basis of the determination that no battery-containing product candidate appears in the surface image. This reduces the operation rate of the X-ray sensor 22, and thus reduces the running cost. Accordingly, the object processing apparatus according to Embodiment 4 can reduce the dose to which objects around the X-ray sensor 22 are exposed to X-rays. Since the information amount of the partial image is smaller than the information amount of the internal image, determining whether the battery candidate appears in the partial image extracted from the internal image is easier and takes less time than determining whether the battery candidate appears in the internal image. Accordingly, the object processing apparatus according to Embodiment 4 can easily determine in a short time whether waste appearing in the surface image and the internal image is a battery-containing product.

When the object recognition control apparatus 31 of the object processing apparatus according to any of Embodiments 2 to 4 makes an erroneous determination such as a determination that waste that is not a battery-containing product is a battery-containing product candidate and a determination that a battery-containing product is not a battery-containing product candidate, a user creates retraining data for surface images. The retraining data for surface images includes data associating the surface image used when the waste that is not a battery-containing product is erroneously determined as a battery-containing product candidate with a determination of "being not a battery-containing product candidate." The retraining data for surface images further includes data associating the surface image used when a battery-containing product is erroneously determined as not the battery-containing product candidate with a determination of "being a battery-containing product candidate." The user retrains the learning model for surface images using the retraining data for surface images to create a new learning model for surface images. The learning model for surface images to be used when the object recognition control apparatus 31 determines whether waste is a battery-containing product candidate is updated to the created new learning model for surface images according to an operation by a user. The update of the learning model for surface images enables the object processing apparatus 1 according to any of Embodiments 2 to 4 to further reduce the frequency of erroneously determination as to whether waste appearing in a surface image is a battery-containing product candidate.

When the object recognition control apparatus 31 of the object processing apparatus according to any of Embodiments 2 to 4 makes an erroneous determination such as a determination that an object that is not a battery is a battery candidate and a determination that a battery is not a battery candidate, a user creates retraining data for internal images. The retraining data for internal images includes data associating the internal image used when the object that is not a battery is erroneously determined as a battery candidate with a determination of "being not a battery candidate." The retraining data for internal images includes data associating the internal image used when the battery is erroneously determined as not a battery candidate with a determination of "being a battery candidate." The user retrains the learning model for internal images using the retraining data for internal images to create a new learning model for internal images. The learning model for internal images to be used when the object recognition control apparatus 31 determines whether an internal object of waste is a battery candidate is updated to the created new learning model for internal images according to an operation by a user. The update of the learning model for internal images enables the object processing apparatus 1 according to any of Embodiments 2 to 4 to further reduce the frequency of erroneously determination as to whether an internal object of waste appearing in an internal image is a battery candidate.

While the object recognition control apparatus 31 of the object processing apparatus according to any of Embodiments 2 to 4 uses the two learning models of the retraining data for surface image and the retraining data for internal images, the object processing apparatus 1 according to Embodiment 1 uses only one learning model for integrated information. Accordingly, the object processing apparatus 1 according to Embodiment 1 can reduce the frequency of erroneous determination by retraining only one learning model for integrated information, and thus easily reduce the frequency of erroneous determination, compared to the object processing apparatus according to any of Embodiments 2 to 4.

In Embodiments 1 to 4, the description given above is of a case where the object processing apparatus determines whether waste appearing in the surface image and the internal image is a battery-containing product by using the learning model generated by machine learning. Alternatively, the determination may be performed without using the learning model. The object processing apparatus can reduce the frequency of erroneous determination by using the surface image and the internal image even when the learning model is not used.

The description given above is of a case where the internal image capturing area 14 of the object processing apparatus according to Embodiment 4 is disposed downstream from the surface image capturing area 12 in the conveyance direction 7. Alternatively, the internal image capturing area 14 may be disposed upstream from the surface image capturing area 12 in the conveyance direction 7. In this case, the object recognition control apparatus 31 determines whether a battery candidate appears in an internal image. On the basis of the determination result, the object recognition control apparatus 31 controls the visible line image sensor 21 to capture a surface image when the battery candidate appears in the internal image, and controls the visible line image sensor 21 not to capture the surface image when no battery candidate appears in the internal image. Also in this case, the object processing apparatus can reduce the frequency of erroneous determination in the same or substantially the same manner as the object processing apparatus according to Embodiment 4. Further, in such an object processing apparatus, the visible line image sensor 21 does not operate when no battery candidate appears in the internal image. Accordingly, the operation rate of the visible line image sensor 21 is reduced, and thus the running cost is reduced.

Embodiment 5

Figure 20:
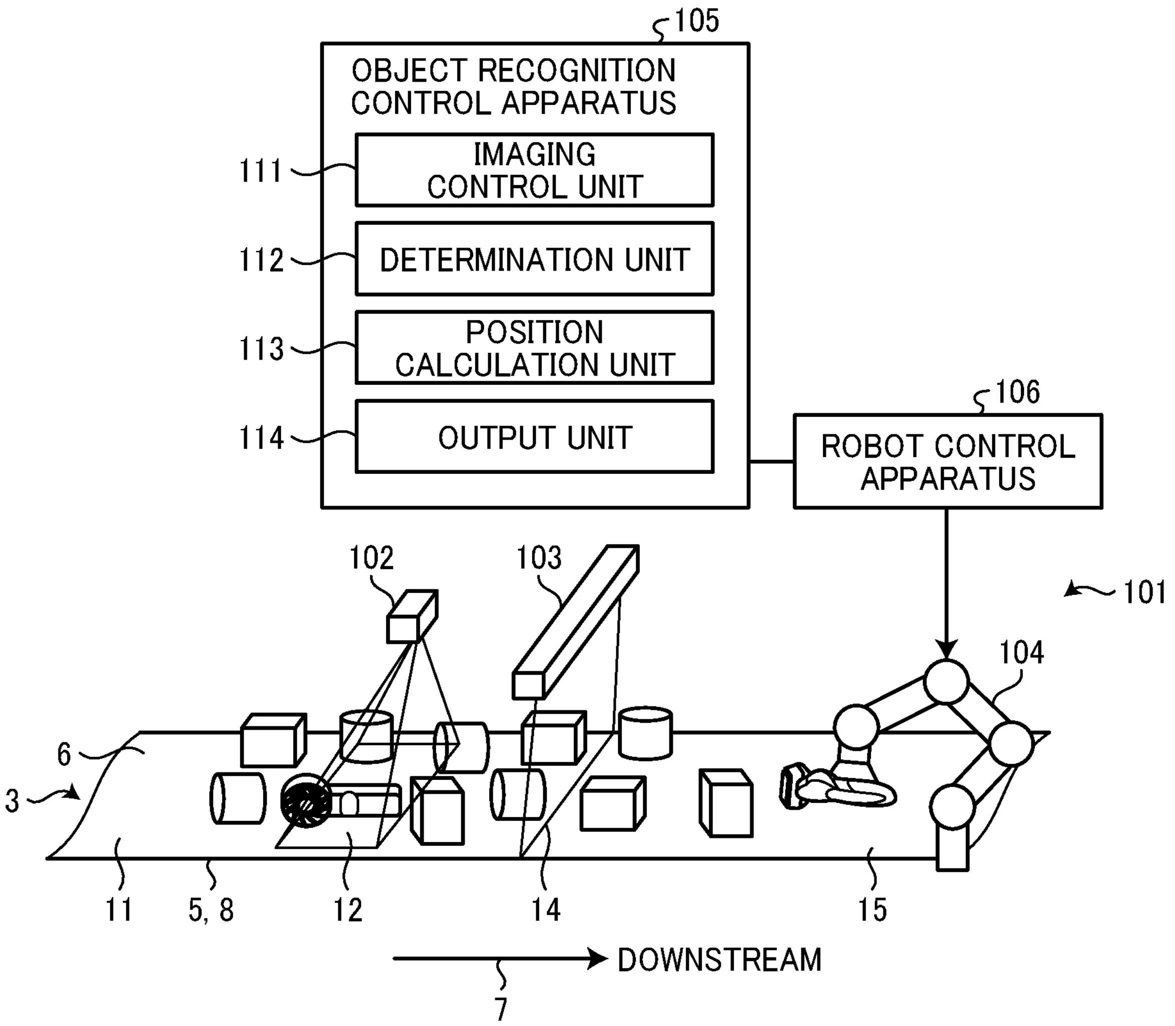
FIG. 20 is a perspective view of an object processing apparatus according to Embodiment 5.

FIG. 20 is a perspective view of an object processing apparatus 101 according to Embodiment 5. The object processing apparatus 101 according to Embodiment 5 includes a visible area image sensor 102, a terahertz sensor 103, a robot 104, an object recognition control apparatus 105, and a robot control apparatus 106. The visible area image sensor 102 is disposed above the surface image capturing area 12 such that the surface image capturing area 12 of the conveyance path 6 is disposed between the conveyance path facing portion 8 of the belt 5 and the visible area image sensor 102. The visible area image sensor 102 receives visible light reflected from the surface of a subject placed on the conveyance path facing portion 8 and disposed in the surface image capturing area 12, and captures a surface image on the basis of the received visible light. Accordingly, the surface of the subject appears in the surface image.

The terahertz sensor 103 is disposed above the internal image capturing area 14 such that the internal image capturing area 14 is disposed between the conveyance path facing portion 8 and the terahertz sensor 103. The terahertz sensor 103 visualizes the internal structure of a subject by using absorption, scattering, and diffraction of terahertz waves. The terahertz sensor 103 emits terahertz waves toward the internal image capturing area 14, receives a terahertz wave reflected from the surface or inside of the subject disposed in the internal image capturing area 14 among the emitted terahertz waves, and captures an internal image on the basis of the received terahertz wave. Accordingly, the outer contour of the subject and an internal object in the subject appear in the internal image.

The robot 104 is disposed near the work area 15. The robot 104 can grip an object disposed in the work area 15 and can move and release the gripped object. In other words, the robot 104 can remove the object from the work area.

The object recognition control apparatus 105 is connected to the visible area image sensor 102, the terahertz sensor 103, and the robot control apparatus 106 so as to communicate information with each other. The object recognition control apparatus 105 is a computer in which multiple computer programs that cause the object recognition control apparatus 105 to function as an imaging control unit 111, a determination unit 112, a position calculation unit 113, and an output unit 114 are installed. The computer program to be installed in the object recognition control apparatus 105 may be downloaded from another computer or may be read from a non-transitory tangible storage medium.

The imaging control unit 111 controls the visible area image sensor 102 to capture a surface image in which a subject that is conveyed along the conveyance path 6 and disposed in the surface image capturing area 12 appears. The imaging control unit 111 controls the terahertz sensor 103 to capture an internal image in which the subject appearing in the captured surface image appears. In the same or substantially the same manner as the determination unit 38, the determination unit 112 determines whether a subject conveyed along the conveyance path 6 is a battery-containing product on the basis of the surface image and the internal image captured by the imaging control unit 111. In the same or substantially the same manner as the position calculation unit 39, when the determination unit 112 determines that the subject is a battery-containing product, the position calculation unit 113 performs image processing on the surface image, to generate imaging-time position information on the basis of the surface image. The imaging-time position information indicates an imaging time when the subject was present in the surface image capturing area 12, and indicates a position where the subject was present at the imaging time. When the determination unit 112 determines that the subject is a battery-containing product, the output unit 114 outputs the imaging-time position information generated by the position calculation unit 113 to the robot control apparatus 106.

The robot control apparatus 106 is connected to the robot 104 so as to communicate information with each other. The robot control apparatus 106 controls the robot 104 to remove the subject appearing in the surface image and the internal image captured by the imaging control unit 111 from the conveyance path 6 on the basis of the imaging-time position information that is output from the object recognition control apparatus 105.

The object recognition control apparatus 105 controls the visible area image sensor 102 to capture a surface image in which waste that is conveyed along the conveyance path 6 and disposed in the surface image capturing area 12 appears. The object recognition control apparatus 105 controls the terahertz sensor 103 to capture an internal image in which the outer contour of waste that is conveyed along the conveyance path 6 and disposed in the surface image capturing area 12 and an internal object that is contained in the waste appear. Specifically, the object recognition control apparatus 105 captures the internal image such that a position where an internal view representing certain waste appears in the internal image matches a position where a surface view representing the certain waste appears in the surface image. In other words, the object recognition control apparatus 105 controls the terahertz sensor 103 to capture an internal image at the time that is delayed from the time when the surface image is captured by a delay time that is calculated on the basis of the conveyance speed and the distance between the surface image capturing area 12 and the internal image capturing area 14.

The object recognition control apparatus 105 generates integrated information on the basis of the surface image and the internal image, and determines whether the waste appearing in the surface image and the internal image is a battery-containing product on the basis of the integrated information. With this configuration, in the same or substantially the same manner as the object processing apparatus 1 according to Embodiment 1, the object processing apparatus 101 according to Embodiment 5 can reduce the frequency of erroneously determining that a battery-containing product is not a battery-containing product or erroneously determining that waste that is not a battery-containing product is a battery-containing product.

When the object recognition control apparatus 105 determines that the waste appearing in the surface image and the internal image is a battery-containing product, the object recognition control apparatus 105 performs image processing on the surface image, to calculate imaging-time position information. The imaging-time position information indicates an imaging time when the battery-containing product was present in the surface image capturing area 12, and indicates a position where the battery-containing product was present at the imaging time. When the object recognition control apparatus 105 determines that the waste appearing in the surface image and the internal image is a battery-containing product, the object recognition control apparatus 105 further outputs the calculated imaging-time position information to the robot control apparatus 106.

The robot control apparatus 106 calculates a removal time and a removal position on the basis of the conveyance speed and the imaging-time position information. The removal time indicates the time when the battery-containing product is present in the work area 15. The removal position indicates the position where the battery-containing product is present at the removal time. The robot control apparatus 106 controls the robot 104 on the basis of the removal time and the removal position, to remove the battery-containing product from the conveyance path 6. The waste sorting apparatus including the object processing apparatus 101 according to Embodiment 5 can reduce the frequency of erroneous determination. Thus, in the same or substantially the same manner as the waste sorting apparatus 2, the waste sorting apparatus including the object processing apparatus according to Embodiment 5 reduces the frequency with which the battery-containing product is supplied to the shredder, thus reducing the frequency of ignition in the shredder.

The description given above is of a case where the position calculation unit 39 of the object processing apparatus according to any of Embodiment 1 to 4 and the position calculation unit 113 of the object processing apparatus according to Embodiment 5 calculate the imaging-time position information on the basis of the surface image. Alternatively, the position calculation unit 39 and the position calculation unit 113 may calculate the imaging-time position information on the basis of the internal image. The object processing apparatus can appropriately calculate an area where the battery-containing product is present in the work area 15 even when the imaging-time position information is calculated on the basis of the internal image. The object processing apparatus thus configured does not have to include another means for detecting the position of the battery-containing product in the work area 15 in addition to the X-ray sensor 22 or the terahertz sensor 103. This reduces the number of components and the manufacturing cost.

Embodiment 6

Figure 21:
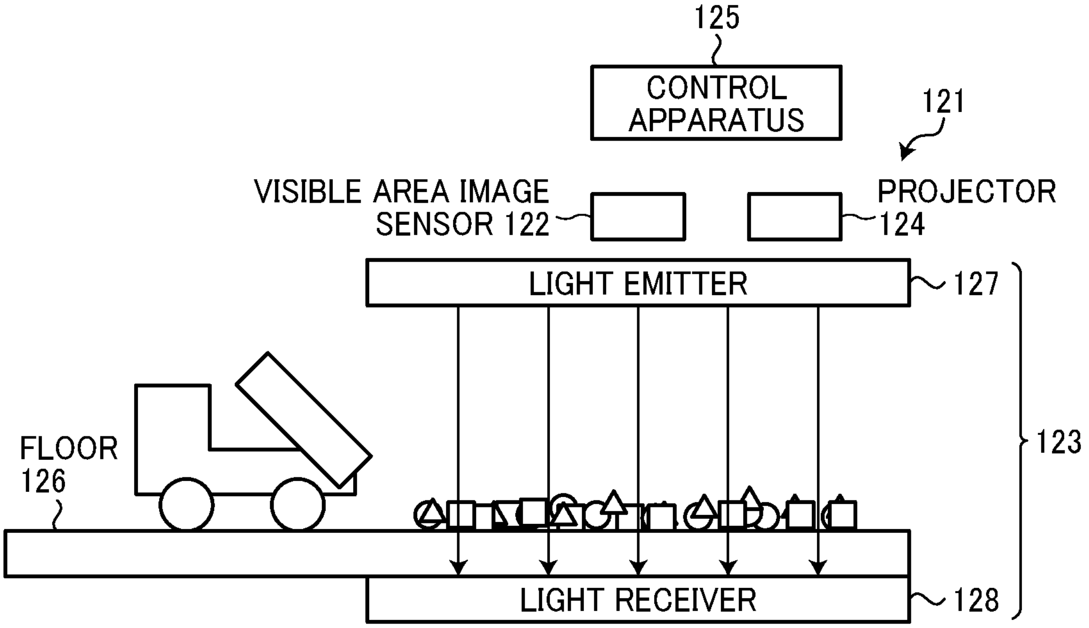
FIG. 21 is a cross-sectional side view of an object processing apparatus according to Embodiment 6.

FIG. 21 is a cross-sectional side view of an object processing apparatus 121 according to Embodiment 6. The object processing apparatus 121 according to Embodiment 6 includes a visible area image sensor 122, an X-ray sensor 123, a projector 124, and a control apparatus 125. The visible area image sensor 122 is disposed above a floor 126. The visible area image sensor 122 receives visible light reflected from the surfaces of multiple pieces of waste on the floor 126, and captures a surface image in which the surfaces of the multiple pieces of waste appear on the basis of the received visible light.

The X-ray sensor 123 includes a light emitter 127 and a light receiver 128. The light emitter 127 is disposed above the floor 126. The light emitter 127 emits X-rays toward the floor 126. The light receiver 128 is disposed below the floor 126. The light receiver 128 receives transmitted X-rays transmitted through the multiple pieces of garbage on the floor 126 among X-rays emitted from the light emitter 127. On the basis of the transmitted X-rays received by the light receiver 128, the X-ray sensor 123 captures an internal image in which the outer contours of the multiple pieces of waste on the floor 126 and multiple internal objects that are contained in the multiple pieces of waste appear.

The projector 124 is disposed above the floor 126. The projector 124 performs projection mapping to project video onto an object that is present on the floor 126.

The object processing apparatus 121 according to Embodiment 6 is used for waste sorting to find a battery-containing product from multiple pieces of waste scattered on the floor 126. The control apparatus 125 controls the visible area image sensor 122 to capture a surface image in which the surfaces of the multiple pieces of waste on the floor 126 appear. The control apparatus 125 controls the X-ray sensor 123 to capture an internal image in which the outer contours of the multiple pieces of waste on the floor 126 and multiple internal object contained in the multiple pieces of waste appear. In the same or substantially the same manner as the object recognition control apparatus 31 of the object processing apparatus according to any of Embodiment 1 to 4 and the object recognition control apparatus 105 of the object processing apparatus according to Embodiment 5, the control apparatus 125 determines whether each of the multiple pieces of waste appearing in the surface image and the internal image is a battery-containing product on the basis of the surface image and the internal image. With this configuration, in the same or substantially the same manner as the object processing apparatus according to any of the above-described embodiments, the object processing apparatus 121 according to Embodiment 6 can reduce the frequency of erroneously determining that a battery-containing product is not a battery-containing product or erroneously determining that waste that is not a battery-containing product is a battery-containing product.

When multiple battery-containing products are included in the multiple pieces of waste appearing in the surface image and the internal image, the control apparatus 125 performs image processing on the surface image, to calculate multiple pieces of position information corresponding to the multiple battery-containing products. The position information corresponding to a certain battery-containing product among the multiple pieces of position information indicates a position where the certain battery-containing product is present. The control apparatus 125 projects a projection mapping image created on the basis of the multiple pieces of position information onto the multiple pieces of waste on the floor 126. The projection mapping image is created such that an area where the multiple battery-containing products are present among the multiple pieces of waste on the floor 126 is conspicuously visually recognizable.

A worker searches the multiple pieces of waste on the floor 126 for a battery-containing product. When the worker finds out a battery-containing product, the worker removes the found battery-containing product from the floor 126. The object processing apparatus 121 according to Embodiment 6 can make it easy for the worker to search for a battery-containing product by the projection mapping that makes the battery-containing product conspicuously visually recognizable, and thus can reduce the frequency with which the worker overlooks the battery-containing product.

The description given above is of a case where the object processing apparatus 121 according to Embodiment 6 includes the X-ray sensor 123. Alternatively, the object processing apparatus may include a terahertz sensor. In the same or substantially the same manner as the object processing apparatus 121 according to Embodiment 6, the object processing apparatus including the terahertz sensor can also reduce the frequency of erroneous determination. When the terahertz sensor is disposed above the floor 126, the object processing apparatus including the terahertz sensor does not have to include a part of the terahertz sensor below the floor 126. Accordingly, compared to the object processing apparatus 121 according to Embodiment 6, the object processing apparatus including the terahertz sensor can be installed in a simple manner.

The description given above is of a case where the object processing apparatus according to any of Embodiments 1 to 6 includes the projector 23, the projector 124, or the robot 104, which is a processing device according to any of the embodiments. Alternatively, the object processing apparatus may include a different processing device that operates on the basis of the determination result indicating whether waste is a battery-containing product. Examples of the different processing device include an audio device that outputs an alarm sound when the waste is determined as a battery-containing product, and a device (i.e., the object recognition control apparatus 31 itself including the output unit 40 or the object recognition control apparatus 105 itself including the output unit 114) that outputs information indicating that the waste is determined as a battery-containing product to another device.

A waste sorting apparatus according to the related art sometimes make an incorrect determination such as a determination that waste which is an object to be removed is not an object to be removed or a determination that waste which is not an object to be removed is an object to be removed.

An object processing apparatus, an object determination method, and a program according to one or more embodiments of the present disclosure can reduce the frequency of erroneously determining whether an object is a target.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An object processing apparatus, comprising:
- an image sensor configured to capture a surface image in which a surface of a subject appears;
- an X-ray sensor configured to capture an internal image in which an internal object in the subject appears;
- circuitry configured to:
  - generate integrated information based on the surface image and the internal image, the integrated information including outer shape information of the subject and color information of the surface of the subject, derived from the surface image, and X-ray transmittance information of the subject and shape information of the internal object, derived from the internal image; and
  - determine, using a learning model for integrated information generated by machine learning, whether the subject indicated by the integrated information is a battery-containing product that has a built-in battery to generate a determination result; and
- a processing device configured to operate based on the determination result,
- wherein the processing device includes a projector, and
- wherein the circuitry is further configured to:
  - calculate a position where the subject is present based on the surface image or the internal image; and
  - in a case that the determination result indicates that the subject is the battery-containing product, control the projector to project video indicating an area where the subject is present onto the subject based on the calculated position.

2. The object processing apparatus of claim 1, wherein the circuitry is further configured to control the image sensor and the X-ray sensor to cause a position of the subject in the surface image and a position of the subject in the internal image to match each other.

3. The object processing apparatus of claim 2, further comprising a conveyor to convey the subject along a conveyance path, wherein
- the image sensor and the X-ray sensor are disposed at different positions along the conveyance path, and
- the circuitry is further configured to control the image sensor and the X-ray sensor to cause the X-ray sensor to capture the internal image at a time different from a time when the image sensor captures the surface image.

4. The object processing apparatus of claim 1, wherein the circuitry is further configured to:
- determine whether the subject is a first target candidate based on the surface image to generate a first determination result;
- determine whether the internal object is a second target candidate based on the internal image to generate a second determination result; and
- in a case that the first determination result indicates that the subject is not the first target candidate or in a case that the second determination result indicates that the internal object is not the second target candidate, determine that the subject is not the battery-containing product.

5. The object processing apparatus of claim 1, wherein the circuitry is further configured to:
- determine whether the subject is a first target candidate based on the surface image to generate a first determination result;
- determine whether the internal object is a second target candidate based on the internal image to generate a second determination result; and
- in a case that the first determination result indicates that the subject is the first target candidate or in a case that the second determination result indicates that the internal object is the second target candidate, determine that the subject is the battery-containing product.

6. The object processing apparatus of claim 1, wherein the circuitry is further configured to:
- determine whether the subject is a first target candidate based on the surface image to generate a first determination result;
- in a case that the first determination result indicates that the subject is the first target candidate, determine whether the subject is a second target candidate based on the internal image to generate a second determination result; and
- in a case that the second determination result indicates that the subject is the second target candidate, determine that the subject is the battery-containing product.

7. An object processing apparatus, comprising:
- an image sensor configured to capture a surface image in which a surface of a subject appears;
- an X-ray sensor configured to capture an internal image in which an internal object in the subject appears;
- circuitry configured to determine whether the subject is a battery-containing product that has a built-in battery based on the surface image and the internal image to generate a determination result; and
- a processing device to operate based on the determination result,
- wherein the circuitry is further configured to:
  - determine whether the subject is a first target candidate based on one of the surface image and the internal image to generate a first determination result;
  - in a case that the first determination result indicates that the subject is the first target candidate, determine whether the subject is a second target candidate based on another one of the surface image and the internal image to generate a second determination result; and
  - in a case that the second determination result indicates that the subject is the second target candidate, determine that the subject is the battery-containing product,
- wherein the processing device includes a projector, and
- wherein the circuitry is further configured to:
  - calculate a position where the subject is present based on the surface image or the internal image; and
  - in a case that the determination result indicates that the subject is the battery-containing product, control the projector to project video indicating an area where the subject is present onto the subject based on the calculated position.

8. The object processing apparatus of claim 7, wherein the circuitry is further configured to determine whether the subject is the battery-containing product based on information obtained by integrating a feature of the surface image and a feature of the internal image.

9. The object processing apparatus of claim 7, wherein the circuitry is further configured to control the image sensor and the X-ray sensor to cause a position of the subject in the surface image and a position of the subject in the internal image to match each other.

10. The object processing apparatus of claim 9, further comprising a conveyor to convey the subject along a conveyance path, wherein the image sensor and the X-ray sensor are disposed at different positions along the conveyance path, and the circuitry is further configured to control the image sensor and the X-ray sensor to cause the X-ray sensor to capture the internal image at a time different from a time when the image sensor captures the surface image.

11. The object processing apparatus of claim 7, wherein the circuitry is further configured to:

in a case that the first determination result indicates that the subject is not the first target candidate, determine that the subject is not the battery-containing product; and in a case that the first determination result indicates that the subject is the first target candidate and the second determination result indicates that the subject is not the second target candidate, determine that the subject is not the battery-containing product.

12. The object processing apparatus of claim 7, wherein the one of the surface image and the internal image is the surface image, and the another one of the surface image and the internal image is the internal image.

13. A non-transitory computer-executable medium storing a plurality of instructions which, when executed by a processor, causes the processor to perform a method comprising:

acquiring a surface image in which a surface of a subject appears;

acquiring an internal image in which an internal object in the subject appears; and generating integrated information based on the surface image and the internal image, the integrated information including outer shape information of the subject and color information of the surface of the subject, derived from the surface image, and X-ray transmittance information of the subject and shape information of the internal object, derived from the internal image;

determining, using a learning model for integrated information generated by machine learning, whether the subject indicated by the integrated information is a battery-containing product that has a built-in battery to generate a determination result; and calculating a position where the subject is present based on the surface image or the internal image; and in a case that the determination result indicates that the subject is the battery-containing product, controlling a projector to project video indicating an area where the subject is present onto the subject based on the calculated position.

* * * * *